US006436265B1

United States Patent
Shimada et al.

(10) Patent No.: US 6,436,265 B1
(45) Date of Patent: Aug. 20, 2002

(54) MICROSTRUCTURE ARRAY, AND APPARATUS AND METHOD FOR FORMING THE MICROSTRUCTURE ARRAY, AND A MOLD FOR FABRICATING A MICROSTRUCTURE ARRAY

(75) Inventors: Yasuhiro Shimada, Hadano; Takayuki Yagi, Yokohama; Takayuki Teshima; Takashi Ushijima, both of Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,341

(22) Filed: Mar. 24, 2000

(30) Foreign Application Priority Data

Mar. 29, 1999 (JP) .............................. 11-085040
Dec. 3, 1999 (JP) .......................... 11-343978

(51) Int. Cl.[7] ............................... C25D 5/02
(52) U.S. Cl. ................. 205/125; 205/122; 205/136; 205/150; 205/170; 205/191
(58) Field of Search ................. 205/118, 122, 205/136, 150, 170, 191, 125

(56) References Cited

U.S. PATENT DOCUMENTS 6,027,630 A * 2/2000 Cohen .................... 205/118
6,030,515 A * 2/2000 Heyers et al. ............ 205/118

FOREIGN PATENT DOCUMENTS

| JP | 64-010169 | 1/1989 |
| JP | 01-261601 | 10/1989 |
| JP | 05-303009 | 11/1993 |
| JP | 06-027302 | 2/1994 |
| JP | 08-258051 | 10/1996 |

OTHER PUBLICATIONS

Oikawa et al., "A Distributed–Index Planar Micro–Lens Made of Plastic", Japanese Journal of Applied Physics, vol. 20, No. 1, pp. L51–L54, Jan. 1981.

D. Daly et al., "The Manufacturing of Microlenses by Melting Photoresist", IOP Short Meetings Series No. 30, Institute of Physics, pp. 23–34, May 1, 1991.

* cited by examiner

Primary Examiner—Arun S. Phasge
(74) Attorney, Agent, or Firm—Fitzpatrick, Cella, Harper & Scinto

(57) ABSTRACT

A fabrication method of fabricating an array of microstructures is provided. The method includes the step of preparing a substrate with a surface including a usable region and a dummy region continuously set around the usable region, at least the usable region and the dummy region of the substrate are electrically conductive and have a conductive portion. The method also includes the steps of forming a first insulating layer on the conductive portion, and forming a plurality of openings in the first insulating layer, the openings being arranged in a predetermined array pattern. Additionally, the method includes the step of performing one of electroplating and electrodeposition using the conductive portion as an electrode to form a first plated or electrodeposited layer in the openings and on the first insulating layer in both the usable region and the dummy region.

51 Claims, 20 Drawing Sheets

MICROSTRUCTURE ARRAY, AND APPARATUS AND METHOD FOR FORMING THE MICROSTRUCTURE ARRAY, AND A MOLD FOR FABRICATING A MICROSTRUCTURE ARRAY

BACKGROUND OF THE INVENTION

1. Field of the Invention

The present invention relates to a fabrication method of a microstructure array, a fabrication method of a mold or a master of a mold (in the specification the term "mold" is chiefly used in a broad sense including both a mold and a master of a mold) for forming a microstructure array, a fabrication method of a microstructure array using the mold, and a microstructure array. This invention particularly relates to a mold for forming a microlens array, a fabrication method of the mold, and a fabrication method of the microlens array using the mold.

2. Description of the Related Background Art

A microlens array typically has a structure of arrayed minute lenses each having a diameter from about 2 or 3 microns to about 200 or 300 microns and an approximately semispherical profile. The microlens array is usable in a variety of applications, such as liquid-crystal display devices, optical receivers and inter-fiber connections in optical communication systems.

Meanwhile, earnest developments have been made with respect to a surface emitting laser and the like which can be readily arranged in an array with narrow pitches between the devices. Accordingly, there exists a significant need for a microlens array with narrow lens intervals and a large numerical aperture (NA).

Likewise, a light receiving device, such as a charge coupled device (CCD), has been more and more downsized as semiconductor processing techniques develop and advance. Therefore, also in this field, the need for a microlens array with narrow lens intervals and a large NA is increasing.

In the field of such a microlens, a desirable structure is a microlens with a large light-condensing efficiency which can highly efficiently utilize light incident on its lens surface.

Further, similar desires exist in prospective fields of optical information processing, such as optical parallel processing-operations and optical interconnections. Furthermore, display devices of active or self-radiating types, such as electroluminescence (EL) panels, have been enthusiastically studied and developed, and a highly-defined and highly-luminous display has been thus proposed. In such a display, there is a heightened desire for a microlens array which can be produced at a relatively low cost and with a large area as well as with a small lens size and a large NA.

There are presently a number of prior art methods for fabricating microlenses.

In a prior art microlens-array fabrication method using an ion exchange method (see M. Oikawa, et al., Jpn. J. Appl. Phys. 20(1) L51–54, 1981), a refractive index is raised at plural places in a substrate of multi-component glass by using an ion exchange method. A plurality of lenses are thus formed at high-refractive index places. In this method, however, the lens diameter cannot be large, compared with intervals between lenses. Hence, it is difficult to design a lens with a large NA. Further, the fabrication of a large-area microlens array is not easy since a large scale manufacturing apparatus, such as an ion diffusion apparatus, is required to produce such a microlens array. Moreover, an ion exchange process is needed for each glass, in contrast with a molding method using a mold. Therefore, variations of lens quality, such as focal lengths, are likely to increase between lots unless the management of fabrication conditions in the manufacturing apparatus is carefully conducted. In addition to the above, the cost of this method is relatively high, as compared with the method using a mold.

Further, in the ion exchange method, alkaline ions for ion-exchange are indispensable in a glass substrate, and therefore, the material of the substrate is limited to alkaline glass. The alkaline glass is, however, unfit for a semiconductor-based device which needs to be free of alkaline ions. Furthermore, since a thermal expansion coefficient of the glass substrate greatly differs from that of a substrate of a light radiating or receiving device, misalignment between the microlens array and the devices is likely to occur due to a misfit between their thermal expansion coefficients as an integration density of the devices increases.

Moreover, a compressive strain inherently remains on the glass surface which is processed by the ion exchange method. Accordingly, the glass tends to warp, and hence, a difficulty in joining or bonding between the glass and the light radiating or receiving device increases as the size of the microlens array increases.

In another prior art microlens-array fabrication method using a resist reflow (or melting) method (see D. Daly, et al., Proc. Microlens Arrays Teddington., p23–34, 1991), resin formed on a substrate is cylindrically patterned using a photolithography process and a microlens array is fabricated by heating and reflowing the resin. Lenses having various shapes can be fabricated at a low cost by this resist reflow method. Further, this method has no problems of thermal expansion coefficient, warp and so forth, in contrast with the ion exchange method.

In the resist reflow method, however, the profile of the microlens is strongly dependent on the thickness of resin, wetting condition between the substrate and resin, and heating temperature. Therefore, variations between lots are likely to occur while a fabrication reproducibility per a single substrate surface is high.

Further, when adjacent lenses are brought into contact with each other due to the reflow, a desired lens profile cannot be secured due to the surface tension. Accordingly, it is difficult to achieve a high light-condensing efficiency by bringing the adjacent lenses into contact and decreasing an unused area between the lenses. Furthermore, when a lens diameter from about 20 or 30 microns to about 200 or 300 microns is desired, the thickness of deposited resin must be large enough to obtain a spherical surface by the reflow. It is, however, difficult to uniformly and thickly deposit the resin material having desired optical characteristics (such as refractive index and optical transmissivity). Thus, it is difficult to produce a microlens with a large curvature and a relatively large diameter.

In another prior art method, an original plate of a microlens is fabricated, lens material is deposited on the original plate and the deposited lens material is then separated. The original plate or mold is fabricated by an electron-beam lithography method (see Japanese Patent Application Laid-Open No. 1 (1989)-261601), or a wet etching method (see Japanese Patent Application Laid-Open No. 5 (1993)-303009). In these methods, the microlens can be reproduced by molding, variations between lots are unlikely to occur, and the microlens can be fabricated at a low cost. Further, the problems of alignment error and warp due to the difference in the thermal expansion coefficient can be solved, in contrast with the ion exchange method.

In the electron-beam lithography method, however, an electron-beam lithographic apparatus is expensive and a large investment in equipment is needed. Further, it is difficult to fabricate a mold having a large area more than 100 cm² (100 cm-square) because the electron beam impact area is limited.

Further, in the wet etching method, since an isotropic etching using a chemical action is principally employed, an etching of the metal plate into a desired profile cannot be achieved if composition and crystalline structure of the metal plate vary even slightly. In addition, etching will continue unless the plate is washed immediately after a desired shape is obtained. When a minute microlens is to be formed, a deviation of the shape from a desired one is possible due to an etching lasting during a period from the time a desired profile is reached to the time the microlens is reached.

Further, there also exists a mold fabrication method using an electroplating technique (see Japanese Patent Application Laid-Open No. 6 (1994)-27302). In this method, an insulating film having a conductive layer formed on one surface thereof and an opening is used, the electroplating is performed with the conductive layer acting as a cathode, and a protruding portion acting as a mother mold for a lens is formed on a surface of the insulating film. The process of fabricating the mold by this method is simple, and cost is reduced. Similar such methods are also disclosed in Japanese Patent Application Laid-Open No. 8 (1996)-258051 and Japanese Patent Publication No. 64 (1989)-10169.

The problem occurring when a plated layer is formed in an opening by the electroplating technique will be described by reference to FIGS. 1A and 1B. FIGS. 1A and 1B illustrate a radius variation or distribution of plated layers formed in a two-dimensional array on a substrate. In the above fabrication method using the electroplating in an electroplating bath, a distribution or variation of an electroplating-current density occurs over the substrate due to a pattern of the openings (i.e., the electrode pattern) when the electroplating is conducted. More specifically, the electric field is unevenly concentrated and the electroplating growth is hence promoted near the periphery of the pattern of the arrayed openings, as a result of which a distribution or variation of the size of semispherical microstructures 508 occurs in a usable region 505 of the substrate. Therefore, when this substrate is used as a mold for forming a microlens array, specifications of respective microlenses vary over the array.

SUMMARY OF THE INVENTION

An object of the present invention is to provide a method of fabricating a microstructure array (typically a microlens array such as a semispherical microlens array, a flyeye lens and a lenticular lens) flexibly, readily and stably performing, a fabrication method of a mold for forming a microstructure array, a fabrication method of a microstructure array using the mold, and so forth.

In a first aspect of the present invention, a fabrication method of fabricating an array of microstructures is provided. The method includes the step of preparing a substrate with a surface including a usable region and a dummy region continuously set around the usable region. At least the usable region and the dummy region of the substrate are electrically conductive and have a conductive portion. The method further includes the steps of forming a first insulating layer on the conductive portion, and forming a plurality of openings in the first insulating layer, the openings being arranged in a predetermined array pattern. Further, the method includes the step of performing one of electroplating and electrodeposition using the conductive portion as an electrode to form a first plated or electrodeposited layer in the openings and on the first insulating layer in both the usable region and the dummy region.

The predetermined array pattern is typically a two-dimensional array pattern which is periodical in at least one direction, a two-dimensional array pattern which is periodical in mutually-orthogonal four directions, or a periodical stripe pattern. In terms of an influence of the pattern on the distribution of a current density at the time of the electroplating or electrodeposition, the predetermined array pattern is a pattern that creates a current distribution in which the current density is substantially constant in its central portion and gradually increases toward its peripheral portion.

More specifically, the following constructions are possible based on the above fundamental construction.

The fabrication method may further include a step of forming a sacrificial layer under the conductive portion in the dummy region of the substrate, and a step of removing the sacrificial layer to remove the first plated or electrodeposited layer formed in the dummy region. In this case, the fabrication method may further include a step of forming a spacer layer under the conductive portion in the usable region of the substrate to equalize a height level of the conductive portion in the usable region with a height level of the conductive portion in the dummy region.

The fabrication method may further include a step of forming a step layer under the conductive portion in the dummy region of the substrate to differentiate height levels of the conductive portions between the usable region and the dummy region.

The usable region may contain a plurality of blocks. In this case, the blocks may be separated from each other by a boundary portion of the substrate. Further, in such a case, the fabrication method may include a step of forming a sacrificial layer under the conductive portion in the dummy region and the boundary portion of the substrate, and a step of removing the sacrificial layer to remove the first plated or electrodeposited layers formed in the dummy region and the boundary portion. In those methods, the blocks of the usable region may include the same array of the first plated or electrodeposited layers, or different arrays of the first plated or electrodeposited layers, respectively. Further, in those methods, the fabrication method may include a step of dividing the substrate into the blocks after the first plated or electrodeposited layers are formed.

The fabrication method may include a step of cutting off the dummy region of the substrate after the first plated or electrodeposited layers are formed. In this case, the fabrication method may include a step of bonding the substrate with only the usable region or the divided block to a supporting substrate.

The first electrodeposited layer of electrodepositable organic compound may be electrodeposited in the opening and on the first insulating layer, or the first plated layer may be electroplated in the opening and on the first insulating layer.

The fabrication method may further include a step of forming a second insulating layer on the usable region with the first plated layer, and a step of performing an electrolytic etching of the first plated layers in the dummy region without the second insulating layer by applying a voltage using the conductive portion as an anode. In this case, material of the first plated layer removed by the electrolytic etching can be collected in an electroplating bath or on an opposite metal electrode, and therefore, the material of the first plated layer can be reused without waste. Even when precious metal is used, the cost can be made relatively low.

The fabrication method may include a step of removing the second insulating layer after the electrolytic etching is performed, a step of entirely removing the first insulating layer, and a step of forming a second plated or electrodeposited layer continuously on the conductive portion in the dummy region and the first plated layer in the usable region. Since the second layer only needs to be continuously formed to firmly fix the first layer to the conductive portion, the second layer can be formed by electrodepostion or electroless plating as well as electroplating such as DC or pulsed electroplating. Dispersion electroplating, in which dispersion particles such as $Al_2O_3$, $TiO_2$ and PTFE are added to the electroplating bath, can also be used. Mechanical strength and corrosion resistivity of the microstructure can be improved by the dispersion particles. As the electrodeposition substance electrodeposited on the first plated layer using a current, there can be employed an electrodepositable organic compound (acryl-series carboxylic acid resin and the like in the case of the anionic-type electrodeposition, and epoxy-series resin and the like in the case of the cationic-type electrodeposition).

The fabrication method may include a step of removing the first insulating layer not covered with the second insulating layer, and a step of removing the second insulating layer. In this case, the fabrication method may include a step of forming a second plated or electrodeposited layer continuously on the conductive portion in the dummy region and the first plated layer in the dummy region. Here, when the first insulating layer is composed of a material, such as phospho-silicate glass, which has a good adhesion property to the conductive portion, the substrate with only the first plated layer can be used as a mold.

The second plated layer may be formed by electroplating using the conductive portion and the first plated layer as a cathode, electrodeposition using the conductive portion and the first plated layer as an electrode, or electroless plating which can form the second plated layer with a high glossiness. In this case, the second plated layer may be composed of a nickel plated layer. The second plated layer of nickel may be composed of an electroless plated layer, or the second plated layer of nickel may contain phosphor to improve its corrosion resistivity.

The fabrication method may include a step of forming an alignment marker composed of the first plated layer. The alignment marker may be composed of the first plated layer covered with the second insulating layer when the first plated layers in the usable region are covered with the second insulating layer.

The electrolytic etching may be performed using the same electroplating bath used when the first plated layer is formed.

The conductive portion acting as an electrode and the first plated layer may be composed of such materials that do not produce an alloy layer therebetween, respectively. Thereby, the first plated layers in an unneeded region (i.e., dummy region) can be completely removed without leaving any protrusions, and an undesired protrusion will not be formed in the dummy region when the second plated or electrodeposited layer is formed. Such an undesired protrusion is likely to be mistaken as an alignment marker, for example.

The same effect can be achieved when the conductive portion and the first plated layer are composed of such materials that do not produce an alloy layer in the first plated layer due to a diffusion of the material of the conductive portion into the material of the first plated layer, respectively. For example, when the first plated layer is composed of Ni and the conductive portion is composed of Au, Au will be diffused into the first plated layer to produce an alloy layer in the first plated layer. In such a case, a protrusion of the alloy layer will be left when the first plated layer is removed.

In contrast, the conductive portion and the first plated layer may be composed of such materials that produce an alloy layer in the conductive portion due to a diffusion of the material of the first plated layer into the material of the conductive portion, respectively. In such a case, material of the first plated layer will be diffused into the conductive portion to produce an alloy layer in the conductive portion. Therefore, even if the alloy layer is left when the first plated layer is removed, the alloy layer will not create a protrusion in the dummy region. For example, when the first plated layer is composed of Au and the conductive portion is composed of Ni, Au will be diffused into the conductive portion to produce an alloy layer in the conductive portion which has no adverse influence.

A width of the dummy region of the substrate is preferably set to 2 mm or more. This value is independent of an area of the usable region. Such a value is needed to sufficiently unify the distribution of the electric field for electroplating or electrodeposition in the usable region and to push off a relatively large distribution portion into the dummy region. Thereby, the size distribution of the first plated or electrodeposited layers in the usable region can be readily and stably made 5% or less. Such a value makes it possible to achieve a microlens array and the like with a good performance. In this specification, the size or radius distribution is used as a ratio of a difference between a maximum value and an average value relative to the average value concerning the size or radius of first plated or electrodeposited layers in a certain region.

The opening may have a circular shape to obtain a semispherical microstructure, or may have an elongated stripe shape to obtain a semicylindrical microstructure.

The fabrication method may further include a step of forming a mold on the usable region of the substrate with the first plated or electrodeposited layer, and a step of separating the mold from the substrate. In this case, the mold may be formed using electroplating. The mold can be a mold for fabricating a microlens array.

The fabrication method may further include a step of coating a light-transmitting material on the mold, a step of hardening the light-transmitting material, and a step of separating the material from the mold to obtain the microlens array.

The fabrication method may further include a step of coating a light-transmitting material on another substrate, a step of pressing the mold against the light-transmitting material on the substrate, a step of hardening the light-transmitting material, and a step of separating the material from the mold to obtain the microlens array.

The first plated layers may be formed separately from each other. In this case, the first plated layers in the dummy region not covered with the second insulating layer can be electrolytically etched accurately. Further, the first insulating layer can be entirely removed accurately when it is desired.

The fabrication method may further include a step of performing electroplating on the usable region of the substrate to smooth a protruding portion of the first insulating layer at a periphery of the usable region for the purpose of easily handling the substrate.

In another aspect of the present invention, a microstructure array is provided. The microstructure array includes a substrate with a surface including a usable region and a dummy region continuously set around the usable region, at least the usable region and the dummy region of the substrate are electrically conductive and have a conductive portion. The microstructure array also includes a first insulating layer formed on the conductive portion and a plurality of openings formed in the first insulating layer. The openings are arranged in a periodical array pattern. A first plated or electrodeposited layer is formed as a microstructure in the openings and on the first insulating layer in each of the usable region and the dummy region.

In yet another aspect of the present invention, a microstructure array is provided. The microstructure array includes a substrate with a surface including a usable region, the usable region of the substrate being electrically conductive and having a conductive portion. The microstructure array also includes a first insulating layer formed on the conductive portion, and a plurality of openings formed in the first insulating layer. The openings are arranged in a periodical array pattern. A first plated or electrodeposited layer is formed as a microstructure in the openings and on the first insulating layer, and a distribution of a radius of the microstructure is within 5%. Further, a supporting substrate is provided, the substrate being bonded to the supporting substrate In another aspect of the present invention, a microstructure array is provided. The microstructure array includes a substrate with a surface including a usable region and a flat region continuously set around the usable region. The usable region of the substrate is electrically conductive and has a conductive portion. A first insulating layer is formed on the conductive portion, and a plurality of openings are formed in the first insulating layer, the openings being arranged in a periodical array pattern. A first plated or electrodeposited layer is formed as a microstructure in the openings and on the first insulating layer, and a radius distribution of the microstructure is within 5%.

In another aspect of the present invention, a mold for fabricating a convex microlens array is provided. The mold includes a plurality of openings formed in a first insulating layer, the openings being arranged in a periodical array pattern. The mold also includes a first plated or electrodeposited layer formed as a microstructure in the openings and on the first insulating layer. A radius distribution of the microstructure is within 5%.

In yet another aspect of the present invention, a microstructure array is provided. The microstructure array includes a substrate with a surface including a usable region and a flat region continuously set around the usable region. At least the usable region and the flat region of the substrate are electrically conductive and have a conductive portion. A plurality of first plated layers are formed in a periodical array pattern on the usable region as a microstructure array, and a radius distribution of the microstructure is within 5%. A second plated or electrodeposited layer is continuously formed on the conductive portion in the flat region and the first plated layers in the usable region.

These advantages and others will be more readily understood in connection with the following detailed description of the more preferred embodiments in conjunction with the drawings.

Figure 1A:
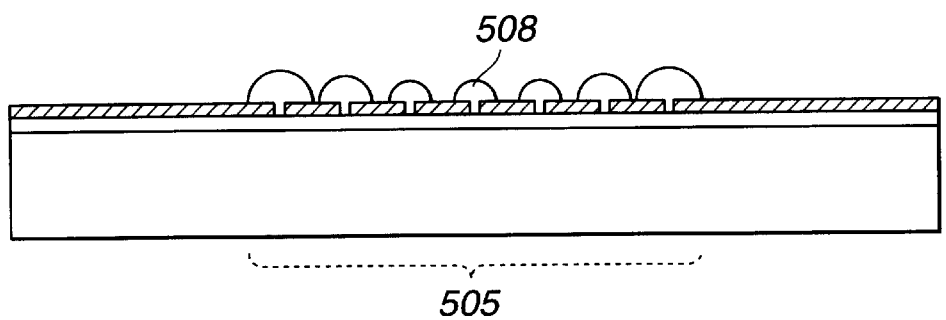
FIGS. 1A and 1B are a cross-sectional view and a plan view, respectively, illustrating a conventional microstructure array formed on a substrate.
Figure 1B:
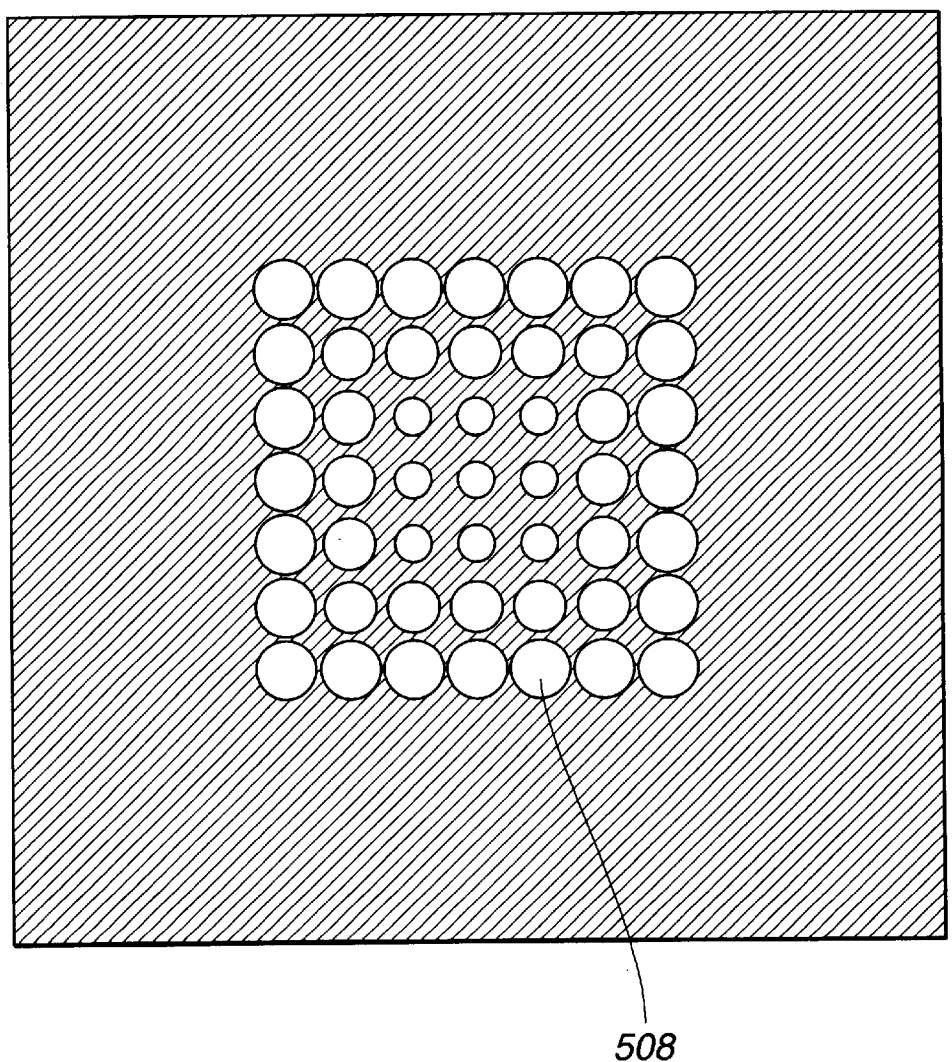

DESCRIPTION OF THE PREFERRED EMBODIMENTS (First Embodiment)

A first embodiment of a fabrication method of a semispherical microstructure array will be described by reference to FIGS. 2A–2D to 5.

Initially, a Ti (titanium) layer of 5 nm in thickness and an Au (gold) layer of 100 nm in thickness are deposited as an electrically-conductive layer 2 on a substrate 1 for electroplating, using a sputtering method. A $SiO_2$ layer of 200 nm in thickness is then deposited as an insulating layer 3 using the sputtering method, and openings 4 are formed in the layer 3 by patterning using photolithography and etching. More specifically, a process of forming the opening 4 in the insulating layer 3 is conducted as follows. After the insulating layer 3 is formed, an opening pattern of photoresist is formed on the layer 3 by photolithography. The openings 4 are formed in the insulating layer 3 using that photoresist as a mask. The photoresist is then removed to leave the openings 4 in the insulating layer 3. A plurality of the openings 4 are formed in a two-dimensional matrix array. The opening 4 has a circular shape and a diameter of 5 μm. All the intervals between the adjacent openings 4 are 25 μm.

Figure 2A:
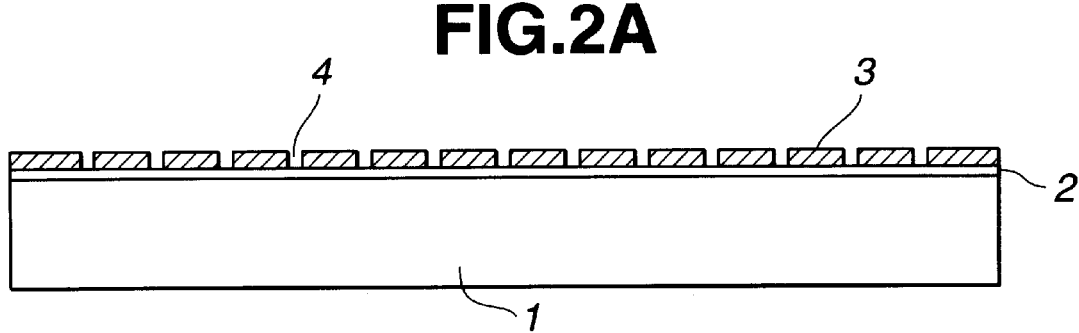
FIGS. 2A to 2D are cross-sectional views illustrating fabrication steps of a fabrication method of fabricating a microlens array mold or the like of a first embodiment according to the present invention.

The semispherical microstructure array of this embodiment has 700×700 semispherical microstructures 8 in its usable region 5. A dummy or buffer region 6 of, for example, 2 mm or more in width is set around the usable region 5. Therefore, 860×860 openings 4 are formed as illustrated in FIGS. 2A, 2B and 3.

An Ni (nickel) electroplating is then performed at a bath temperature of 60° C. and a cathodic current density of 40 $A/dm^2$. The above substrate 1 for electroplating is used as a base, and the conductive layer 12 is used as the cathode. An Ni electroplating bath containing nickel (II) sulfate, nickel (II) chloride, boric acid and brightener is used. An Ni plated layer 7 is initially deposited in the opening 4 and is grown therein. The plated layer 7 expands onto the insulating layer 3, and the semispherical microstructure 8 is thus formed as illustrated in FIGS. 2B and 3. The plated layer 7 is deposited until its radius reaches about 10 μm in the usable region 5. The structure illustrated in FIG. 2B can be used as a semispherical microstructure array.

Figure 2B:
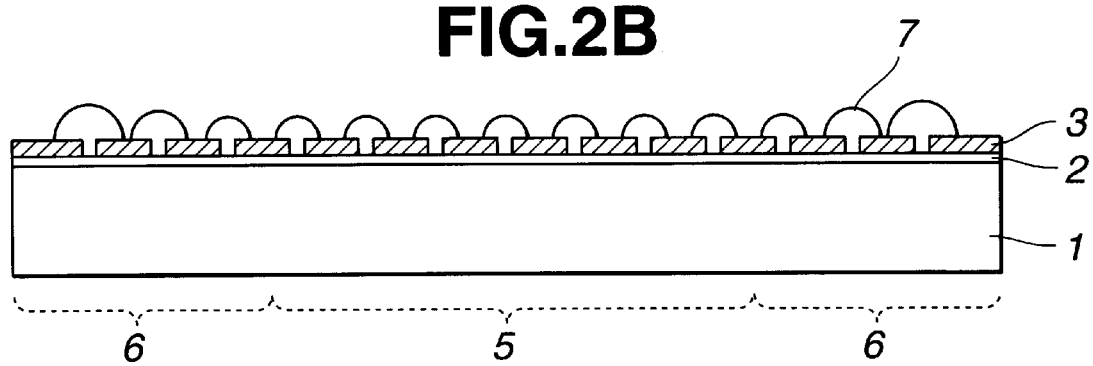
Figure 3:
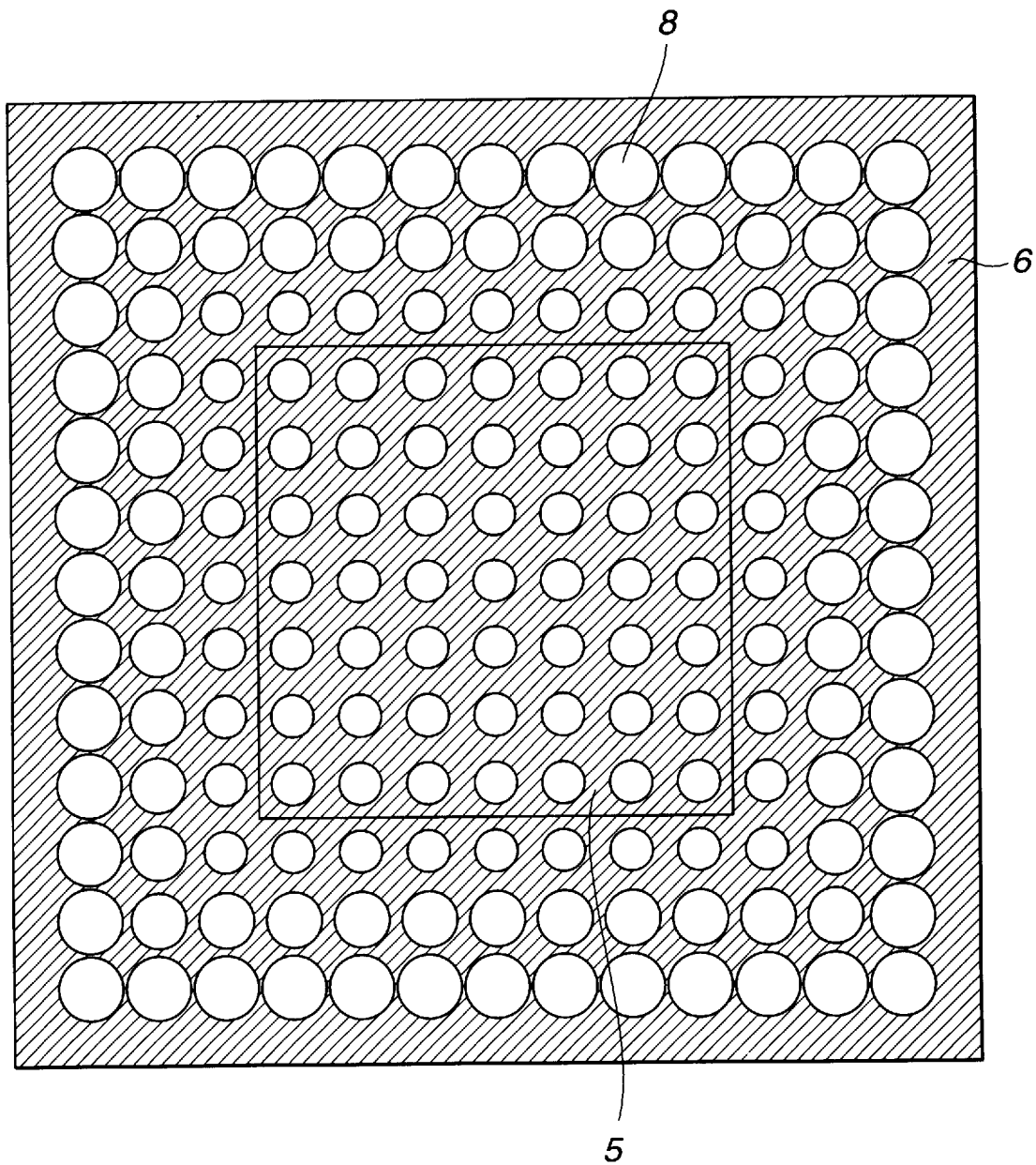
FIG. 3 is a plan view illustrating a substrate of a microstructure array of the first embodiment prior to a step of cutting off a dummy region.

FIG. 3 illustrates the radius distribution of the semispherical microstructures 8 illustrated in FIG. 2B. When the radius of the semispherical microstructure 8 is about 10 μm in the usable region 5, the maximum radius of the semispherical microstructure 8 is about 15 μm in an outermost portion of the dummy region 6. The distribution of the radius in the usable region 5 is within 5%.

Figure 2C:
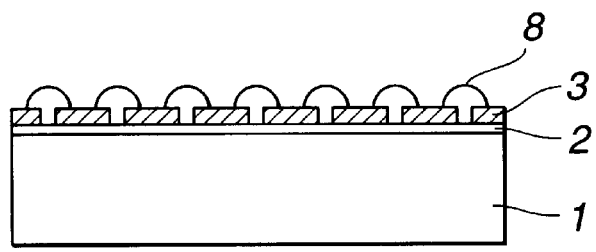

As illustrated in FIG. 2C, the dummy region 6 is cut off by a substrate cutter. Thereby, the semispherical microstructure array with the semispherical microstructures 8 in the usable region 5 can be obtained.

Figure 4:
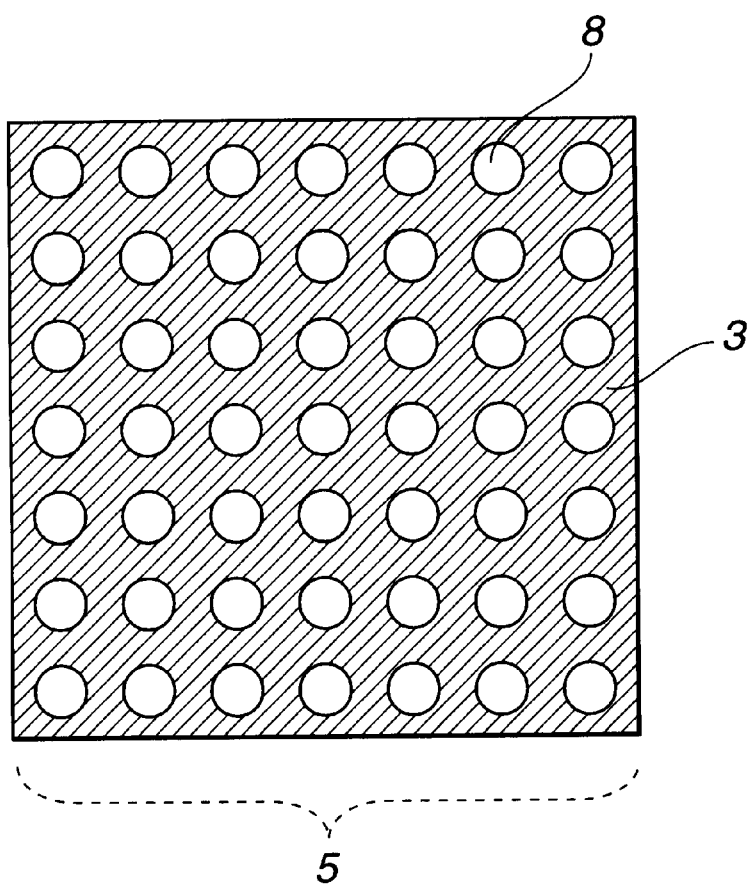
FIG. 4 is a plan view illustrating a substrate of a microstructure array of the first embodiment after the step of cutting off the dummy region.

FIG. 4 illustrates the radius distribution of the semispherical microstructures 8 illustrated in FIG. 2C. As discussed above, the radius distribution of the semispherical microstructures 8 is within 5%.

Figure 2D:
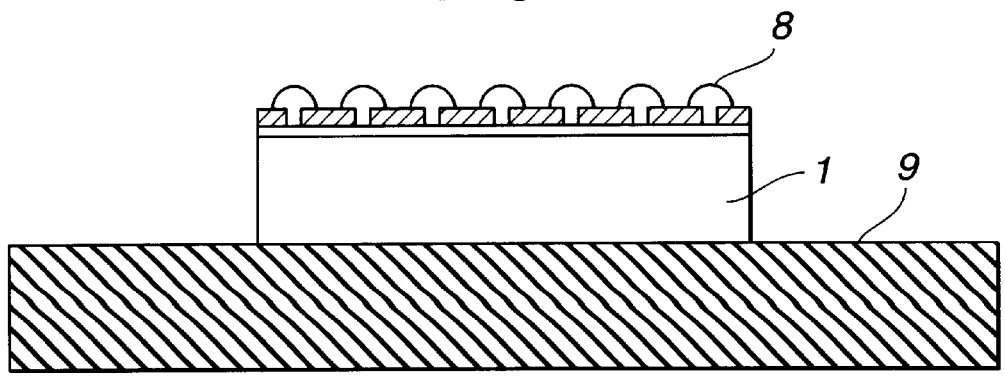

In this embodiment, the substrate 1 of the semispherical microstructure array is bonded to a supporting substrate 9 using an adhesive of epoxy series as illustrated in FIG. 2D.

Figure 5:
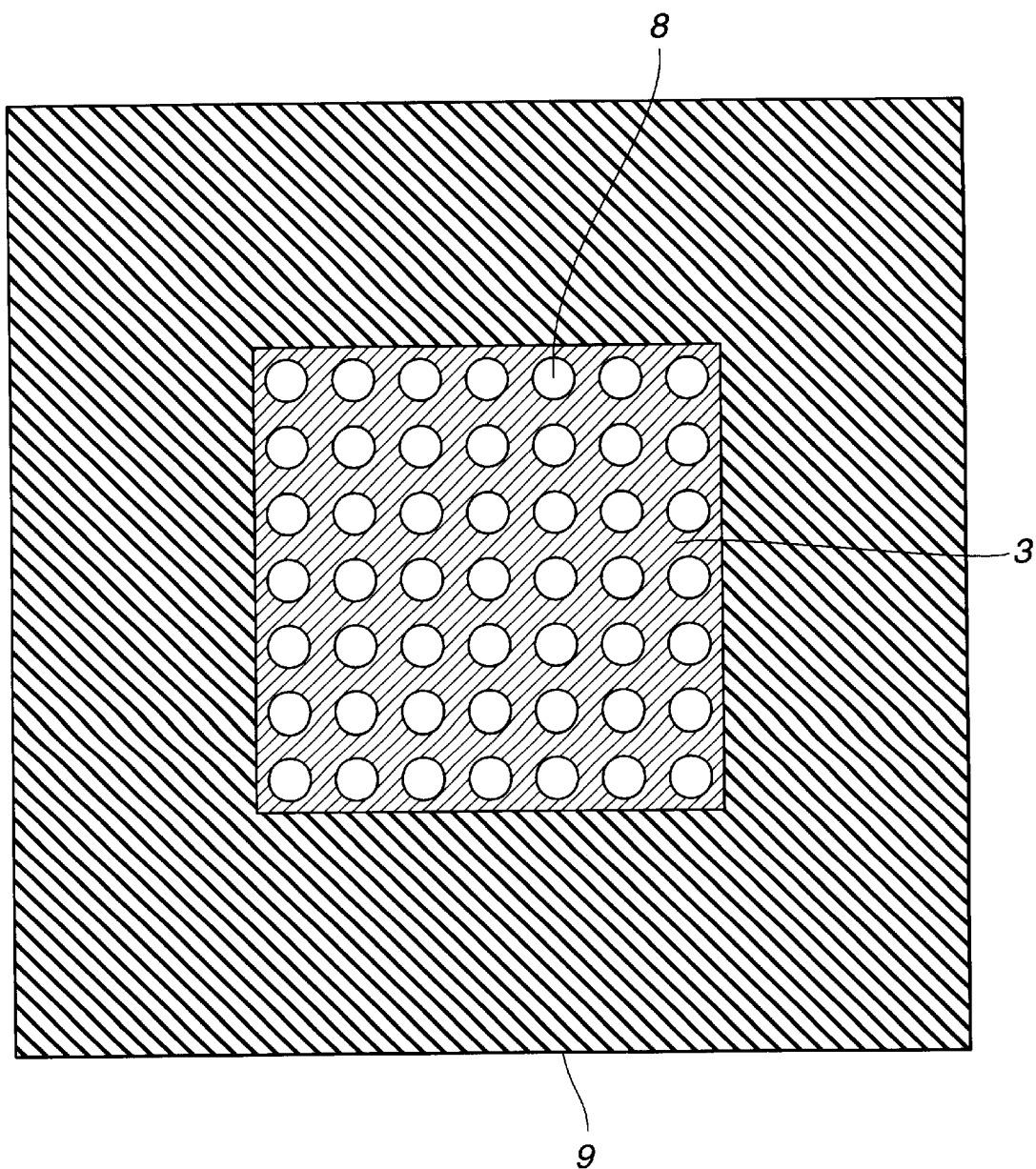
FIG. 5 is a plan view illustrating the substrate of the microstructure array of the first embodiment without the dummy region, which is bonded to a supporting substrate.

FIG. 5 illustrates the radius distribution of semispherical microstructures 8 illustrated in FIG. 2D. In this embodiment, the semispherical microstructure array can be readily handled since the array is bonded to the supporting substrate 9.

According to the fabrication method of this embodiment, the radius distribution of the semispherical microstructures 8 in the usable region 5 can be readily made small.

A mold for fabricating a convex microlens array can be formed as follows. After a remover agent is coated on a semispherical microstructure array of this embodiment (see FIG. 5), an ultraviolet-ray hardening resin or the like is coated on the remover. After that, the resin is hardened and separated from the microstructure array.

Further, after a remover agent is coated on the thus-fabricated mold, a light-transmitting ultraviolet-ray hardening resin or the like is coated on this remover. Thereafter, the resin is hardened and separated from the mold. Thus, a convex microlens array can be obtained. In this convex microlens array, the distribution of the lens radius is within 5%.

In fabricating a microstructure array of this invention, an undesired profile error caused by over-etching proceeding until the washing step is conducted can be prevented. The deposition of the plated layer can be terminated when desired by terminating the current flowing between the anode and the cathode. Current flow is thus ended at the point where a desired profile is obtained. This contrasts with the method of forming a mold by etching, where etching proceeds until the washing step, thus causing a profile error. Accordingly, controllability of the fabrication is superior to the prior art method.

Further, the microstructure array can be directly formed by electroplating or electrodeposition. Therefore, no expensive equipment is needed, fabrication costs can be reduced, and the size of the microstructure can be enlarged readily. Furthermore, the size of the plated layer can be controlled in situ, and the microstructure diameter can be readily and precisely controlled by controlling electroplating time and temperature.

In the above method of fabricating a microlens array, alkaline glass is not necessarily required. Limitations to materials used for the microlens and for the support substrate are lowered, in contrast with the ion exchange method.

The above convex microlens array may be fabricated by other methods, such as a method in which a conventional thermoplastic resin is used and a heated mold is stamped on this resin, a method in which a thermosetting resin is laid over a mold and then heated to be hardened, and a method in which an electron-beam hardening resin is coated on a mold and the resin is hardened by electron beam irradiation.

Since the substrate is used as the mold, the substrate is preferably composed of a substrate with little waviness and low surface roughness. As the substrate, metal plate, a glass substrate, a silicon wafer or the like with an excellent flatness can be preferably used because the substrate has a possibility of warping due to an inner stress or thermal stress of the plated layer.

The material of the electrode layer is selected from materials which are not corrosive to the electroplating liquid used since the electrode layer is exposed to the electroplating liquid. The mask layer may be formed of any inorganic or organic insulating material that is also anticorrosive to the electroplating liquid.

When a thick electrode layer or a thick mask layer is formed on the substrate, its surface roughness may increase depending on the particular forming method. Accordingly, a thin-film forming method, such as a vacuum-evaporation method, a spin-coat method and a dip method is used as a method for forming the electrode layer and the mask layer.

The plated layer is formed by the deposition of metal ions in the electroplating bath caused by the electrochemical reaction. The thickness of the electroplated layer can be readily controlled by controlling the electroplating time and temperature. The following materials are examples of electroplating metals. As a single metal, Ni, Au, Pt, Cr, Cu, Ag, Zn and the like can be employed. As an alloy, Cu—Zn, Sn—Co, Ni—Fe, Ni—W, Zn—Ni and the like can be used. Any material can be used so long as electroplating is possible. Ni, Cr and Cu are especially preferable as the electroplating material for the microlens mold because these metals permit a bright electroplating to be readily achieved.

(Second Embodiment)

FIGS. 6A to 6E illustrate a fabrication method of a second embodiment for fabricating a semispherical microstructure array such as a mold for a microlens array.

Figure 6A:
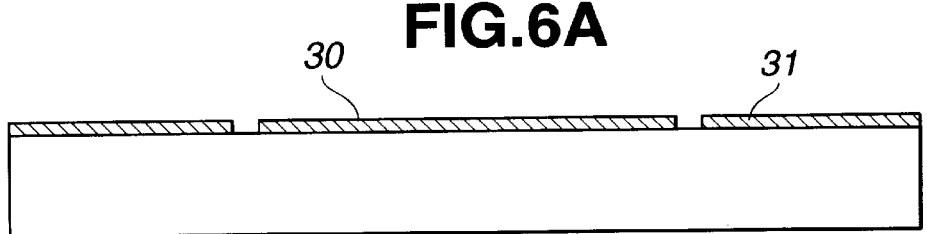
FIGS. 6A to 6E are cross-sectional views illustrating fabrication steps of a method of fabricating a microlens array mold or the like of a second embodiment according to the present invention.

Initially, an $Si_3N_4$ layer of 500 nm in thickness is deposited on a substrate 21 for electroplating, using a low pressure chemical vapor deposition (LPCVD) method. A spacer layer 30 is then formed by patterning using photolithography and etching using a mixture solution of hydrofluoric acid and ammonium fluoride. Thereafter, a phosphosilicate glass (PSG) layer of 500 nm in thickess is deposited on the substrate 21 by a chemical vapor deposition (CVD) method. A sacrificial layer 31 is then formed by patterning using photolithography and etching using a mixture solution of hydrofluoric acid and ammonium fluoride, as illustrated in FIG. 6A.

A Ti layer of 5 nm in thickness and an Au layer of 100 nm in thickness are flatly deposited as an electrically-conductive layer 22 on the substrate 21 with the spacer layer 30 and the sacrificial layer 31, using the sputtering method. Then, a photoresist layer is spin-coated as an insulating layer 23, and openings 24 are formed in the layer 23 by patterning using photolithography and etching. A plurality of the openings 24 are formed in a two-dimensional matrix array. The opening 24 has a circular shape and a diameter of 5 $\mu$m. The interval between the adjacent openings 24 is 25 $\mu$m.

Figure 6B:
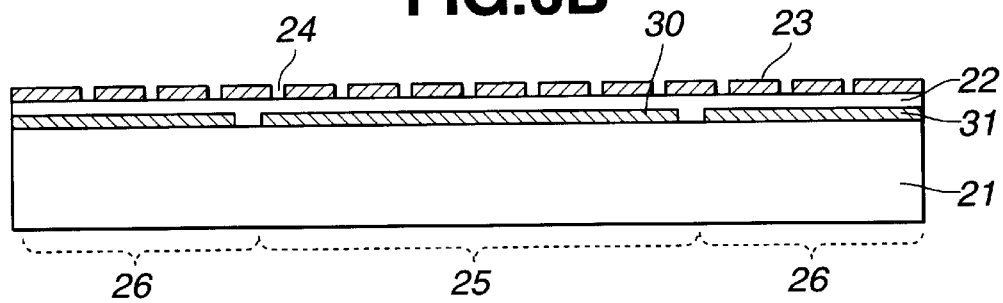

The semispherical microstructure array of this embodiment has 700×700 semispherical microstructures 28 in its usable region 25. A dummy region 26 of 2 mm or more in width is formed all around the usable region 25. As a result, totally 860×860 openings 24 are formed as illustrated in FIG. 6B.

Figure 6C:
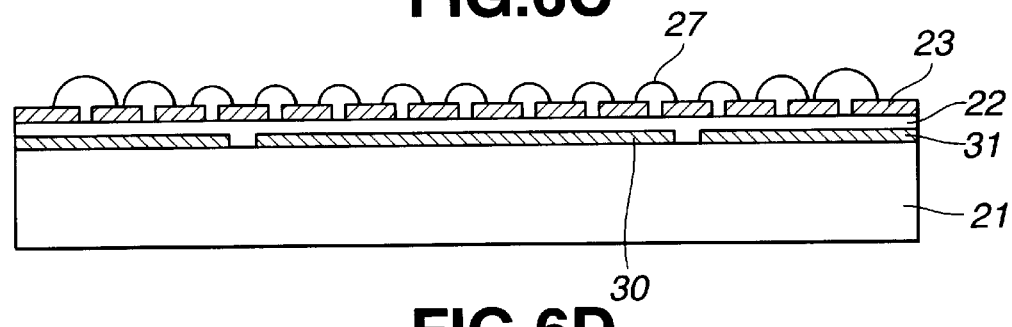

An Ni electroplating is then performed at a bath temperature of 60° C. and a cathodic current density of 40 A/dm$^2$. The above substrate 21 for electroplating is used as a base, and the conductive layer 22 is used as the cathode. An Ni electroplating bath containing nickel (II) sulfate, nickel (II) chloride, boric acid and brightener is used. A Ni plated layer 27 is initially deposited in the opening 24 and is grown therein. The plated layer 27 expands onto the insulating layer 23, and the semispherical microstructure 28 is thus formed as illustrated in FIG. 6C. The plated layer 27 is deposited until its radius reaches about 10 $\mu$m in the usable region 25.

Figure 6D:
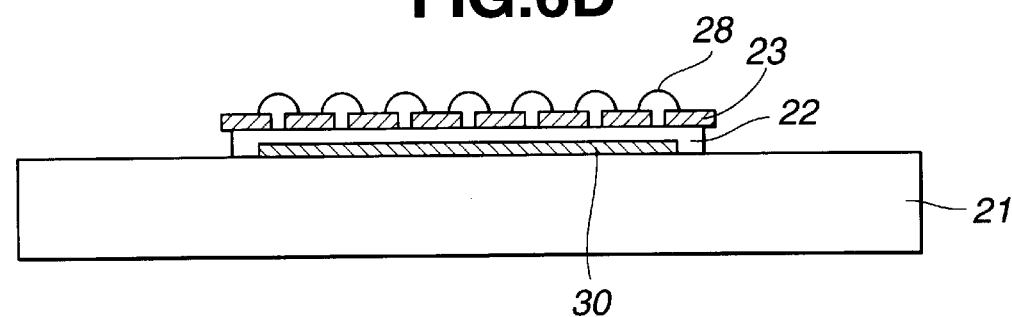

The sacrificial layer 31 is then removed by etching using a mixture solution of hydrofluoric acid and ammonium fluoride to yield the structure illustrated in FIG. 6D. Thereby, a semispherical microstructure array with the semispherical microstructures 28 in the usable region 25 can be achieved.

Figure 7:
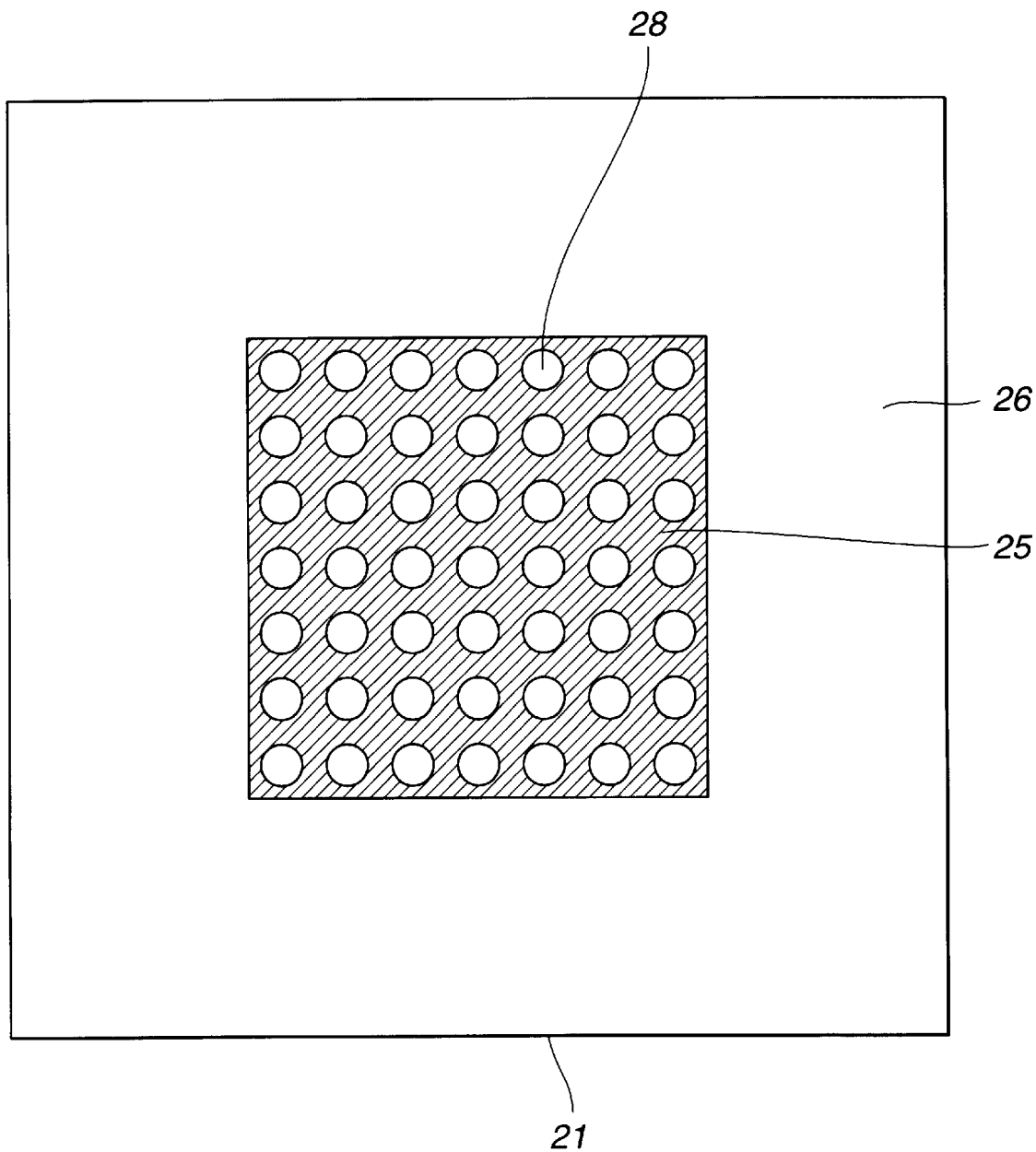
FIG. 7 is a plan view illustrating a substrate of a microstructure array of the second embodiment after a step of removing a dummy region.

FIG. 7 illustrates the radius distribution of the semispherical microstructures 28 illustrated in FIG. 6D. When the radius of the semispherical microstructure 28 in the usable region 25 is about 10 $\mu$m, the maximum radius of the semispherical microstructure 28 is about 15 $\mu$m in an outermost portion of the dummy region 26. Nevertheless, the distribution of the radius in the usable region 25 is within 5%.

Figure 6E:
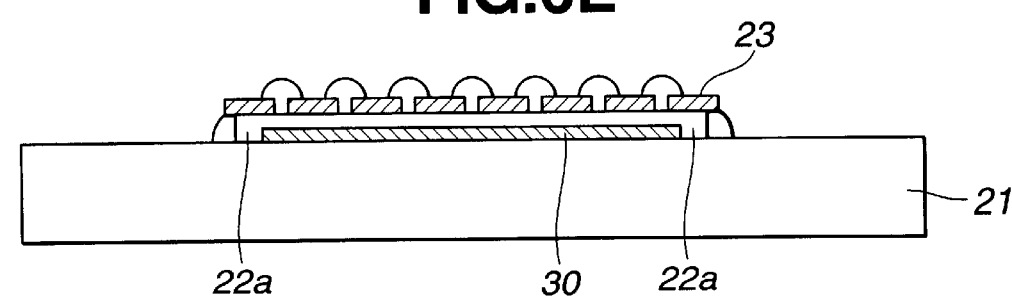

In this embodiment, when electroplating is further performed, a plated portion is formed at an edge portion 22a of the conductive layer 22, and hence, a protruding portion of the mask layer 23 at the periphery of the usable region 25 can be eliminated as illustrated in FIG. 6E. Thereby, when this structure is used as a mold, the mold can be readily separated from a molded product.

As described above, according to the fabrication method of this embodiment, the radius distribution of the semispherical microstructures 28 in the usable region 25 can be readily made small.

(Third Embodiment)

Figure 8A:
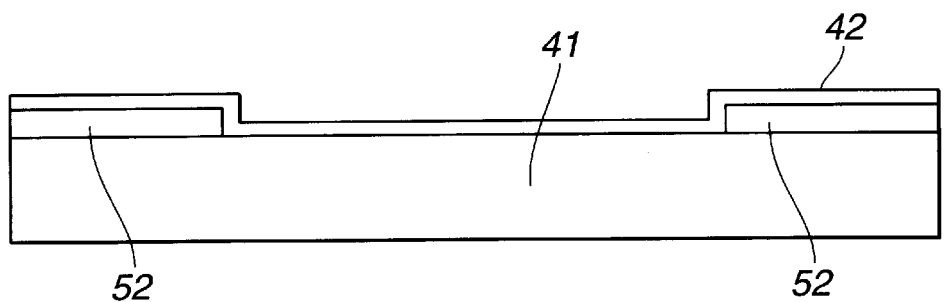
FIGS. 8A to 8C are cross-sectional views illustrating fabrication steps of a method of fabricating a microlens array mold or the like of a third embodiment according to the present invention.
Figure 8B:
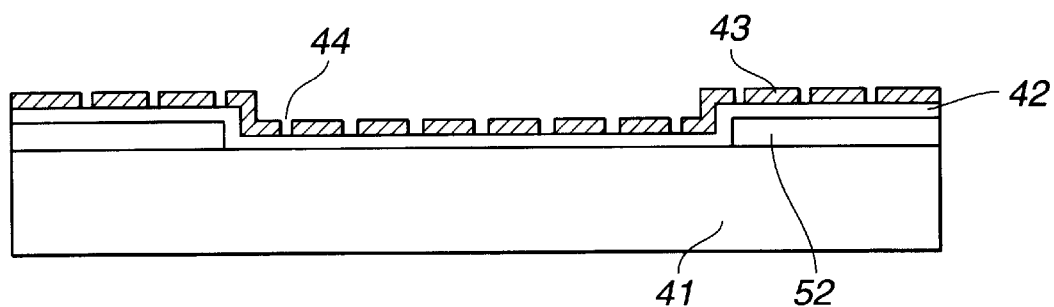
Figure 8C:
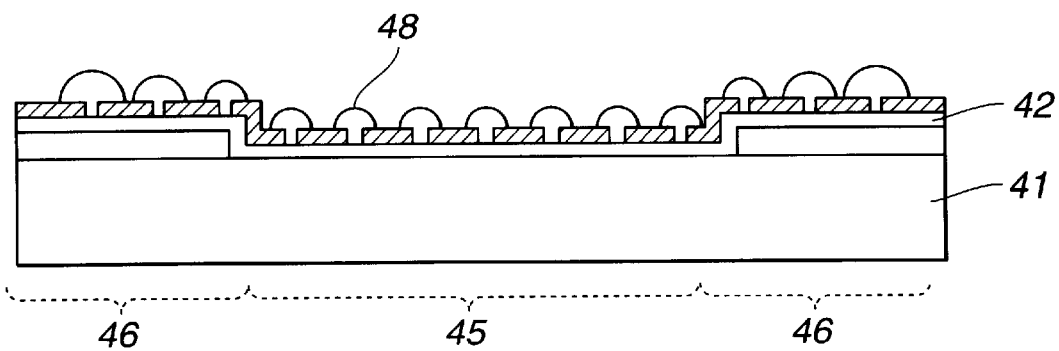

FIGS. 8A to 8C illustrate a fabrication method of a third embodiment of a semispherical microstructure array such as a mold for a microlens array.

Initially, a PSG layer of 5 $\mu$m in thickess is deposited on a substrate 41 for electroplating by the CVD method. Thereafter, a step portion 52 is formed by the patterning using photolithography and etching using a mixture solution of hydrofluoric acid and ammonium fluoride to yield the structure illustrated in FIG. 8A.

A Ti layer of 5 nm in thickness and an Au layer of 100 nm in thickness are then deposited as an electrically-conductive layer 42 using the sputtering method to yield the structure illustrated in FIG. 8A.

A photoresist layer is spin-coated as an insulating layer 43, and openings 44 are formed in the layer 43 by patterning using photolithography and etching to yield the structure illustrated in FIG. 8B. A plurality of openings 44 are formed in a two-dimensional matrix array. The opening 44 has a circular shape and a diameter of 5 $\mu$m. The interval between the adjacent openings 44 is 25 $\mu$m.

The semispherical microstructure array of this embodiment has 700×700 semispherical microstructures 48 in its usable region 45. A dummy region 46 of 2 mm or more in width is set around the usable region 45. Therefore, 860×860 openings 44 are formed as illustrated in FIG. 8B.

An Ni electroplating is then performed at a bath temperature of 60° C. and a cathodic current density of 40 A/dm$^2$. The above substrate 41 for electroplating is used as a base, and the conductive layer 42 is used as the cathode. An Ni electroplating bath containing nickel (II) sulfate, nickel (II) chloride, boric acid and brightener is used. An Ni plated layer 48 is initially deposited in the opening 44 and is grown therein. The plated layer 48 expands onto the insulating layer 43, and the semispherical microstructure 48 is thus formed as illustrated in FIG. 8C. The plated layer 48 is deposited until its radius reaches about 10 $\mu$m in the usable region 45, as illustrated in FIG. 8C. Here, the radius distribution of the semispherical microstructures 48 in the usable region 45 is within 5%, though the maximum radius of the semispherical microstructure 48 is about 15 $\mu$m in an outermost portion of the dummy region 46.

Figure 9A:
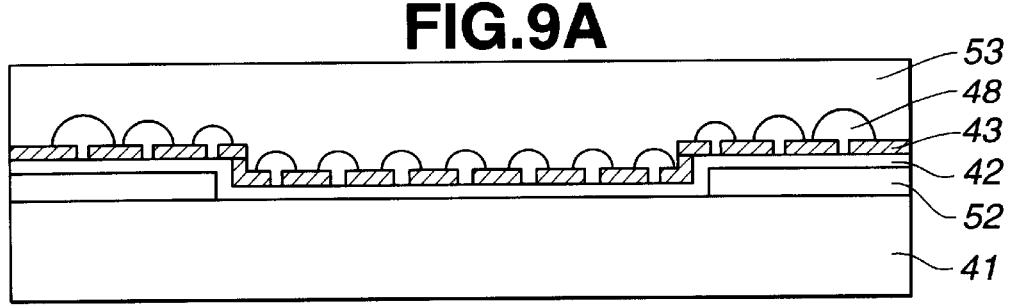
FIGS. 9A to 9F are cross-sectional views illustrating fabrication steps of a method of fabricating a microlens of the third embodiment.
Figure 9B:
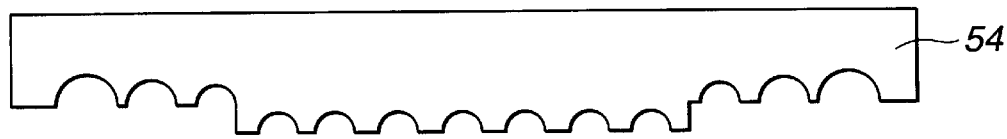
Figure 9C:

FIGS. 9A to 9F illustrate fabrication of a mold for forming a microlens array and a microlens array using the above substrate 41 for electroplating. After a remover agent is coated on the substrate 41, an ultraviolet-ray hardening resin 53 or the like is coated on the remover as illustrated in FIG. 9A. After that, the resin 53 is hardened and separated from the microstructure array. Thus, a mold 54 for a microlens is obtained as illustrated in FIG. 9B. The mold 54 can also be obtained in the following manner. After a sacrificial layer and a conductive layer are deposited on the substrate 41 with the semispherical microstructures 48, electroplating is conducted. The mold 54 of an Ni plated layer can be formed by removing the sacrificial layer.

Then, a PSG layer of 5 $\mu$m in thickess is deposited on a glass substrate 55 by the CVD method. Thereafter, a sacrificial layer 56 of PSG is formed by patterning using photolithography and the etching using a mixture solution of hydrofluoric acid and ammonium fluoride to yield the structure illustrated in FIG. 9C.

Figure 9D:
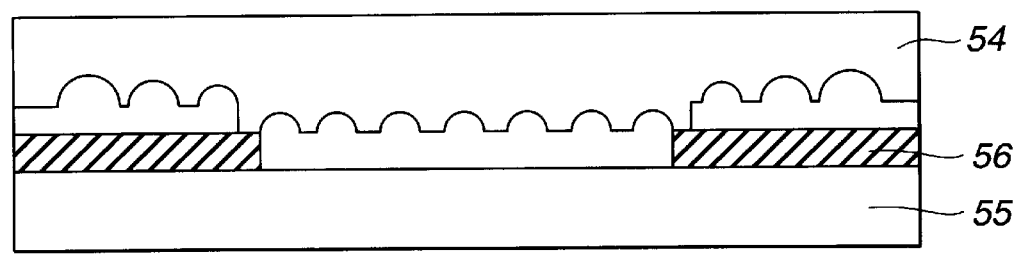
Figure 9E:
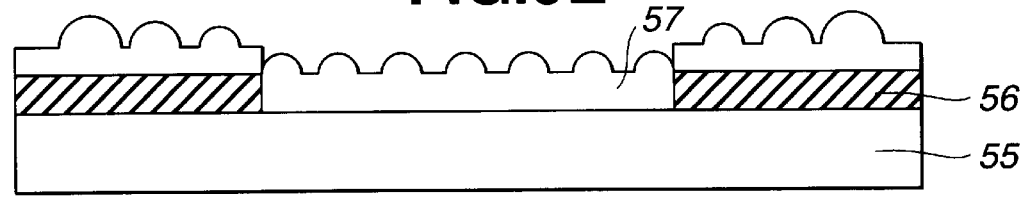

An ultraviolet-ray hardening resin 57 is coated on the substrate 55. The mold 54 with a remover agent coated thereon is aligned with and pressed against the substrate 55 as illustrated in FIG. 9D. The mold 54 is then separated from the hardened resin 57 as illustrated in FIG. 9E.

Figure 9F:
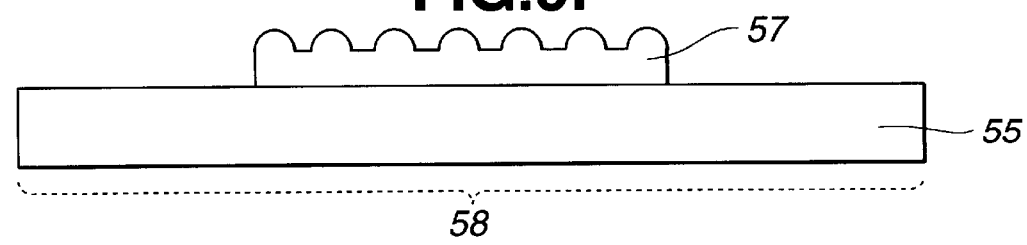

The sacrificial layer 56 is removed by the etching using a mixture solution of hydrofluoric acid and ammonium fluoride to yield the structure illustrated in FIG. 9F. Thus, a semispherical microlens array 58 can be obtained. The radius distribution of the thus-fabricated microlens array 58 is within 5%.

(Fourth Embodiment)

Figure 10A:
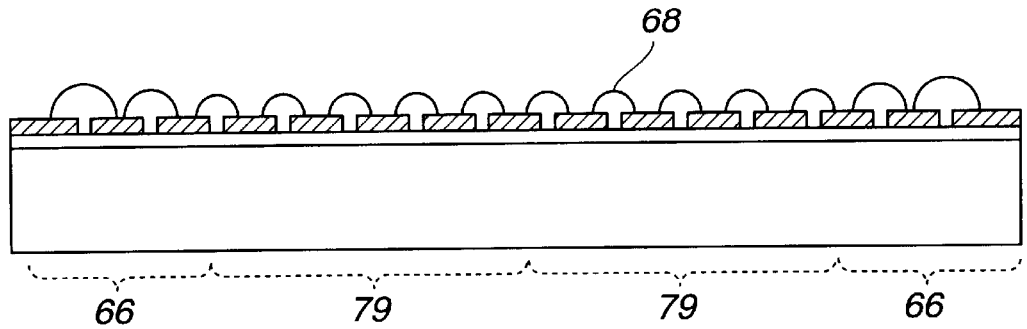
FIGS. 10A and 10B are a cross-sectional view and a plan view, respectively, illustrating a microstructure array formed on a substrate of a fourth embodiment according to the present invention.
Figure 10B:
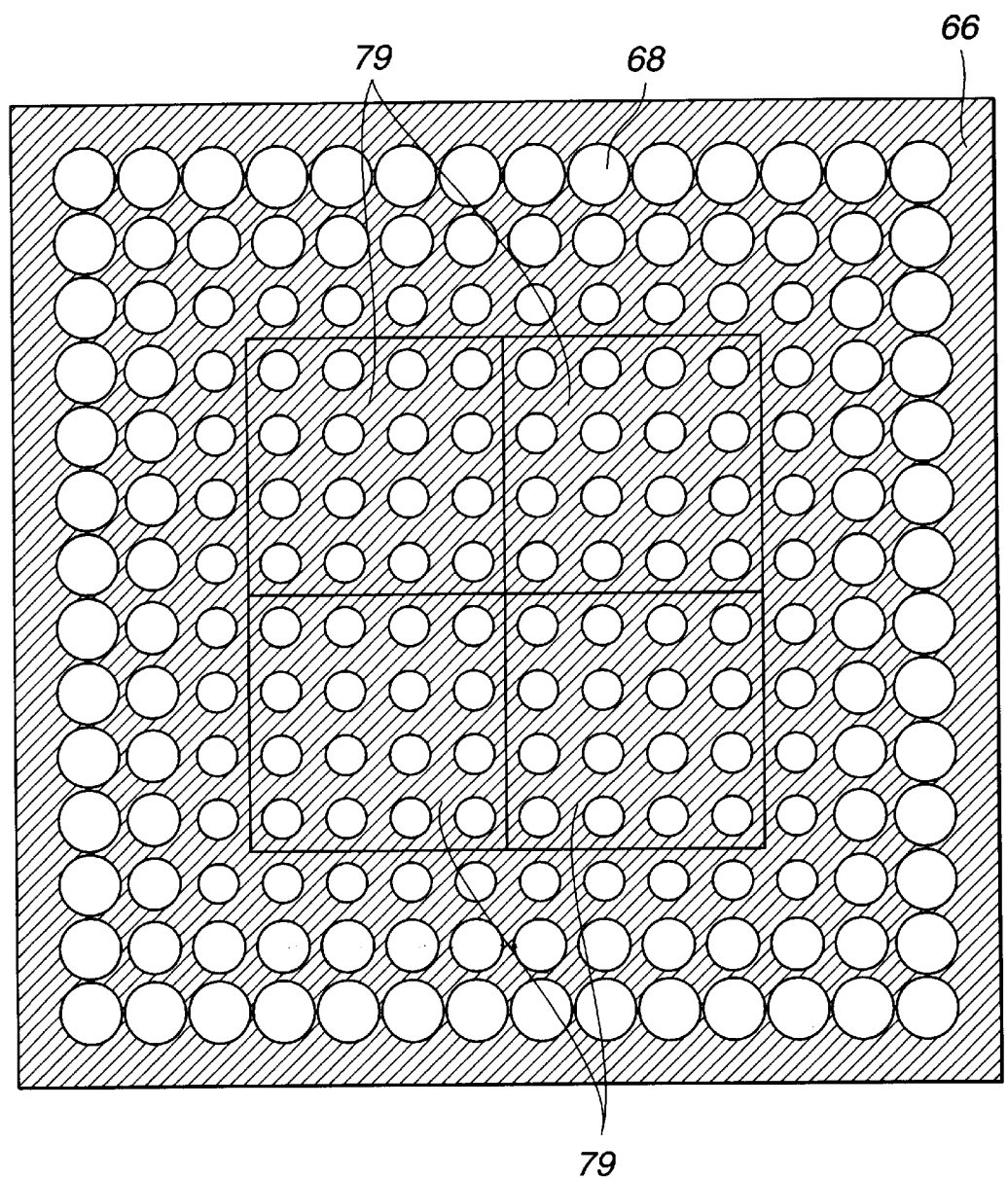

A fourth embodiment is directed to a fabrication method of a semispherical microstructure array which is similar to the first embodiment, but in which a usable region is divided into four blocks 79 as illustrated in FIGS. 10A and 10B. Each block includes 500×500 semispherical microstructures 68. The interval between adjacent microstructures 68 is 25 $\mu$m.

The fabrication method of the fourth embodiment will be described. After a dummy region 66 around the usable region is cut off using a substrate cutter as in the first embodiment, the blocks 79 are separated from each other by the cutter. Thus, the semispherical microstructure array is obtained in each block 79.

After that, each block 79 is bonded to the supporting substrate 9 using an epoxy-series adhesive (see FIG. 2D). The radius distribution of the semispherical microstructures 68 in each block 79 is within 5%. Using the fabrication method of this embodiment, a plurality of semispherical microstructure arrays can be effectively produced by setting a relatively small-sized dummy region.

The fourth embodiment can be combined with a method of the second embodiment. More specifically, the spacer layer 30 is formed at a portion corresponding to each block 79, and the sacrificial layer 31 is formed at not only the dummy region 66 but a space between the blocks 79 (see FIG. 6A). The substrate for electroplating is thus formed. By performing electroplating, the plated layer is deposited on the substrate. After that, microstructures 68 in the dummy region 66 and between the blocks 79 are removed by removing the sacrificial layer 31. Here, the microstructures 8 between the blocks 79 lie in about a row. Finally, the substrate is cut along the portion between the blocks 79, and the dummy region 66 is cut off using the substrate cutter.

(Fifth Embodiment)

A fifth embodiment of a fabrication method of a mold for a semispherical microstructure array such as a microlens array will be described by reference to FIGS. 11A to 11F.

A silicon wafer is thermally oxidized using an oxidizing gas, and layers of silicon dioxide with a thickness of 1 $\mu$m are formed on opposite surfaces of the wafer. This wafer is used as a substrate 101 illustrated in FIG. 11A. Ti and Pt are continuously layered with thicknesses of 50 Å and 500 Å on the above wafer, respectively, using a vacuum sputtering method which is one of the thin-film forming methods. The electrode layer 102 is thus formed. Positive photoresist (for example, Az1500 (trade name) produced by Hoechst Com.) is then coated to form a first insulating mask layer 103.

Figure 11A:
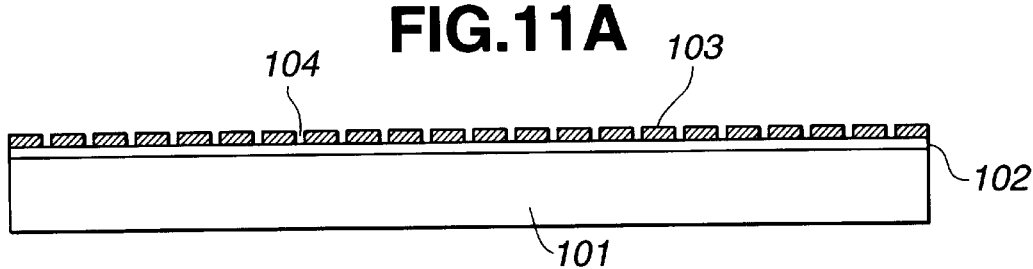
FIGS. 11A to 11F are cross-sectional views illustrating fabrication steps of a method of fabricating a microlens array mold or the like of a fifth embodiment and so forth according to the present invention, respectively.

Another photoresist is then coated on the first mask layer 103. Optical exposure and development of this photoresist are performed using photolithography. Thereafter, with this photoresist used as a mask, etching is conducted to partially expose the electrode layer 102. Openings 104 are thus formed in the first mask layer 103 as illustrated in FIG. 11A.

As formed, the opening 104 has a circular shape and a diameter of 5 $\mu$m. The interval between the adjacent openings 104 is 25 $\mu$m. In this embodiment, 860×860 openings 104 are formed.

Figure 11B:
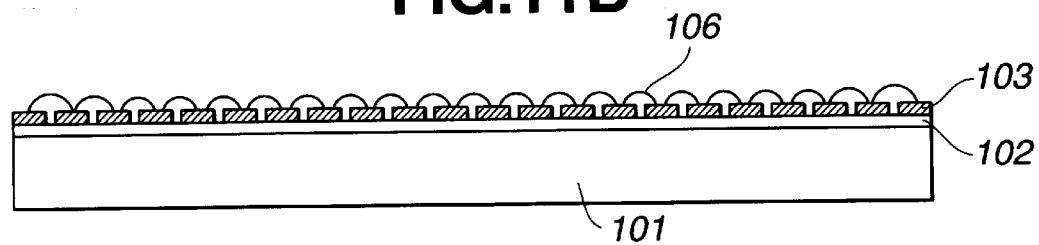
Figure 11C:
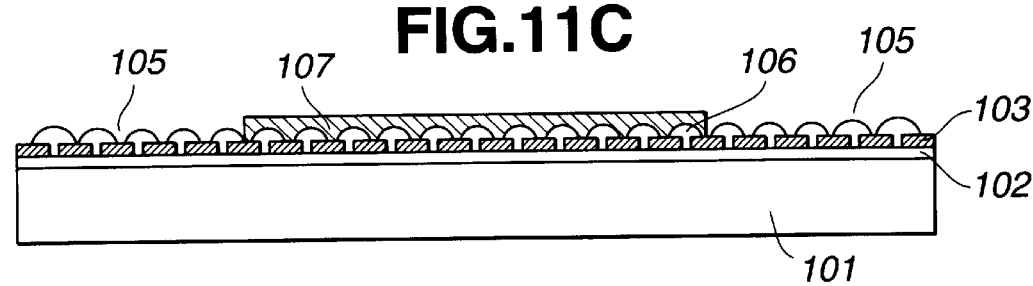

An Ni electroplating is then performed at a bath temperature of 60° C. and a cathodic current density of 40 A/dm$^2$. The above substrate 101 for electroplating is used as a base, and the electrode layer 102 is used as the cathode. An Ni electroplating bath containing nickel (II) sulfate, nickel (II) chloride, boric acid and brightener is used. A first Ni plated layer 106 is initially deposited in the opening 104 and is grown therein. The plated layer 106 expands onto the first mask layer 103, and a semispherical microstructure array is thus formed as illustrated in FIG. 11B. The plated layer 106 is deposited until its radius reaches about 10 $\mu$m in a central or usable region of the semispherical microstructure array.

Figure 12:
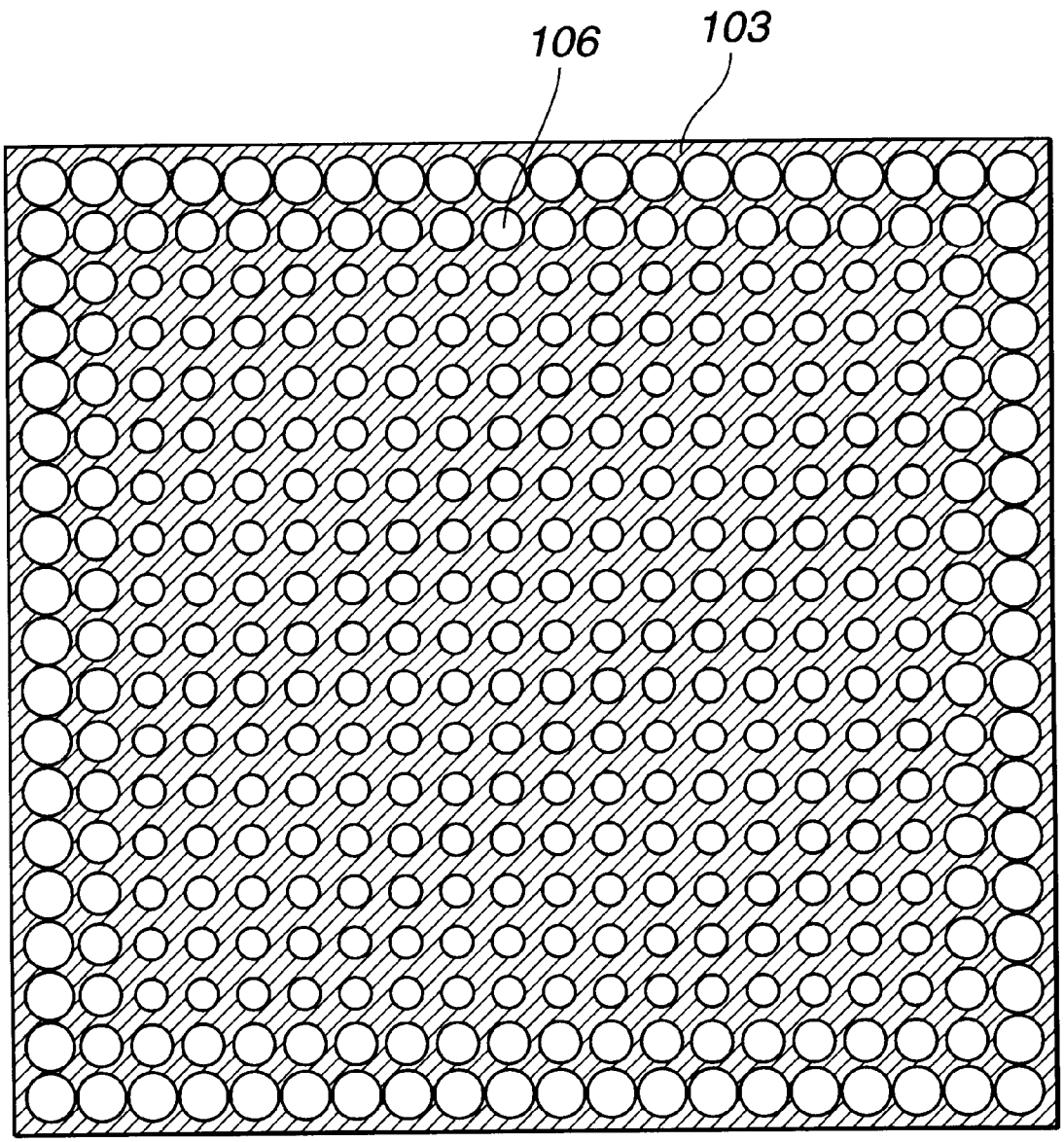
FIG. 12 is a plan view illustrating a substrate of a microstructure array after a step of FIG. 11B.

FIG. 12 illustrates the radius distribution of semispherical microstructures 106 illustrated in FIG. 11B. When the radius of the semispherical microstructure 106 is about 10 $\mu$m, the maximum radius of the semispherical microstructure 106 is about 15 $\mu$m in a peripheral or dummy region 105 of the array.

Figure 13:
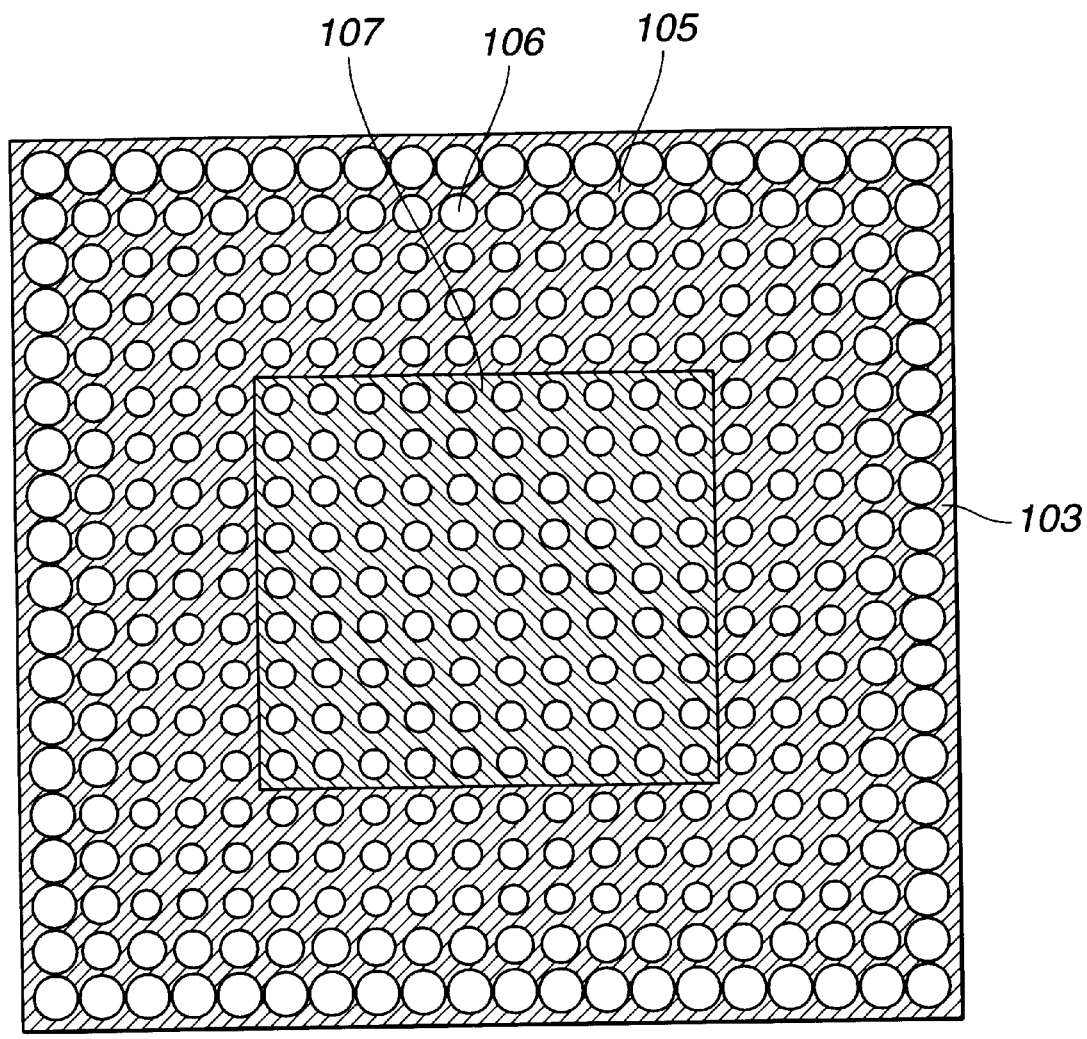
FIG. 13 is a plan view illustrating the substrate of the microstructure array after a step of FIG. 11C.

Positive photoresist (such as AzP 4620 (trade name) produced by Hoechst Com.) is then coated, optically exposed and developed. Thus, a second mask layer 107 is selectively formed in the usable region of 700×700 microstructures, but not in the dummy region 105 of 2 mm in width. The first plated layers 106 in the dummy region 105 are exposed as illustrated in FIG. 1C. FIG. 13 illustrates this structure. The radius distribution of the first plated layers 106 covered with the second mask layer 107 is within 5%.

Figure 11D:
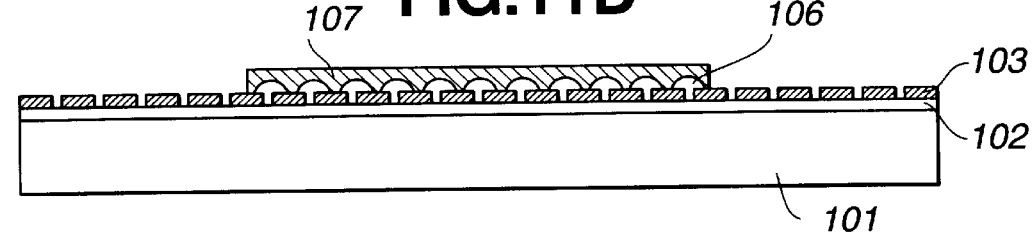

An electrolytic etching of the exposed first plated layers 106 is then performed at a bath temperature of 60° C. and an anodic current density of 8 A/dm$^2$ as illustrated in FIG. 11D. The above substrate 101 is used as a base, and the electrode layer 102 is used as the anode. An Ni electroplating bath containing nickel (II) sulfate, nickel (II) chloride, boric acid and brightener is used. Since the electrode layer 102 is formed of Pt, the electrode layer 102 is not corroded. The electrolytic etching is stopped when the exposed first plated layers 106 of Ni are consumed.

Figure 14:
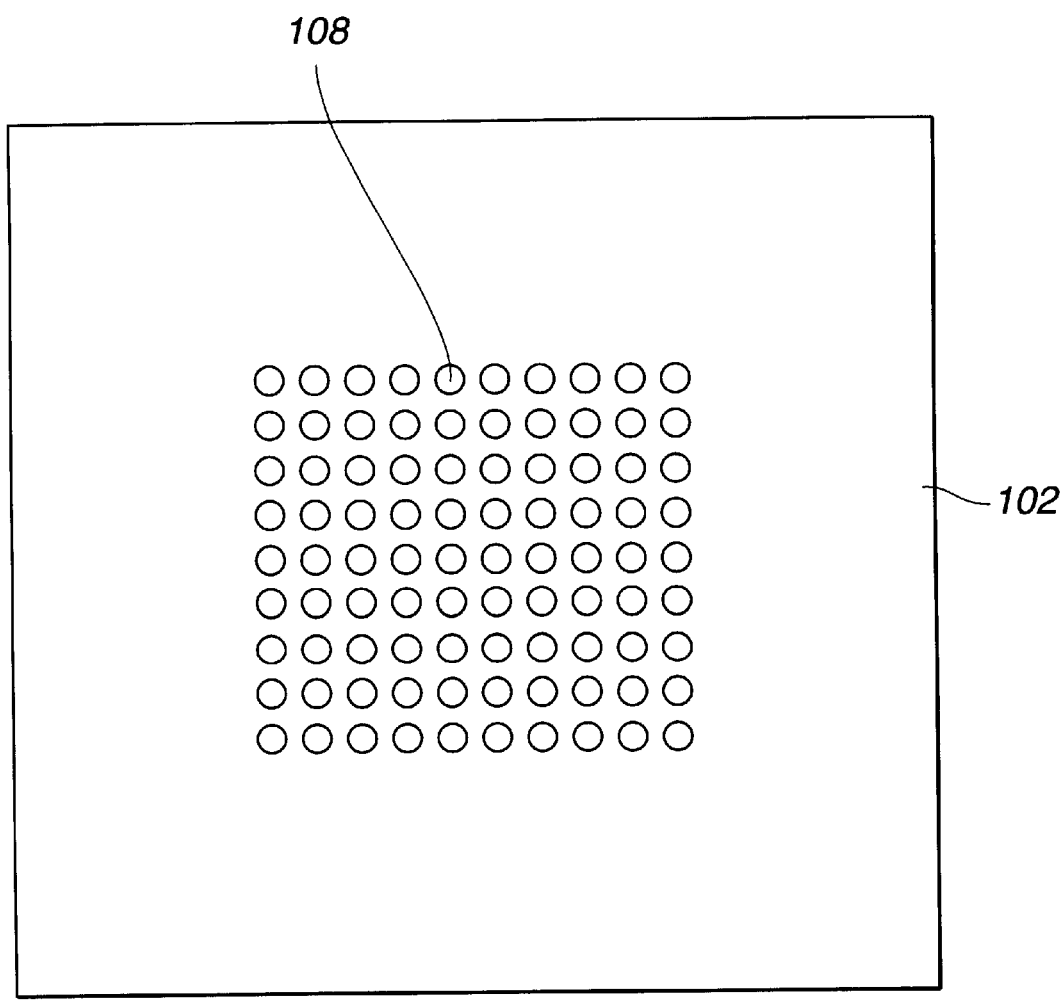
FIG. 14 is a plan view illustrating the substrate of the microstructure array after a step of FIG. 11E.

The first and second mask layers 103 and 107 are then removed using acetone and dimethylformamide to form a semispherical microstructure array with 700×700 semispherical microstructures 108 as illustrated in FIG. 1E. FIG. 14 illustrates the distribution of the semispherical microstructures 108 illustrated in FIG. 11E. The radius distribution of the semispherical microstructures 108 is within 5%.

Figure 11E:
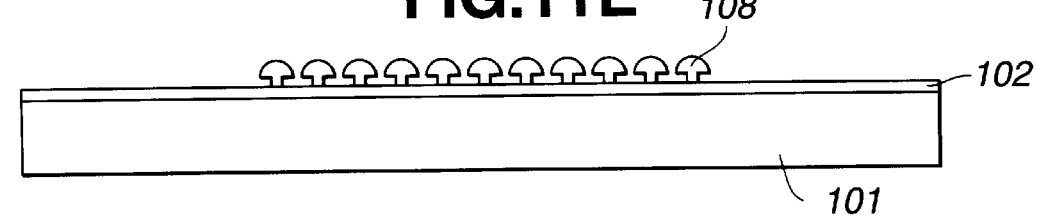
Figure 11F:
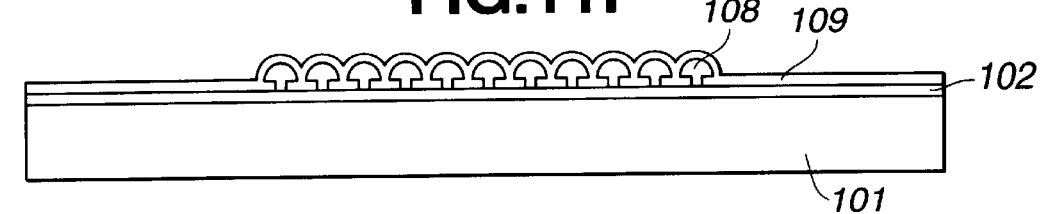

An Ni electroplating of a second plated layer 109 is then performed at a bath temperature of 60° C. and a cathodic current density of 8 A/dm$^2$, as illustrated in FIG. 11F. The above electrode layer 102 and the microstructures 108 are used as the cathode. An Ni electroplating bath containing nickel (II) sulfate, nickel (II) chloride, boric acid and brightener is used. Thus, a mold for a microlens array with the first plated layer 106 firmly fixed on the electrode layer 102 can be obtained.

Figure 15A:
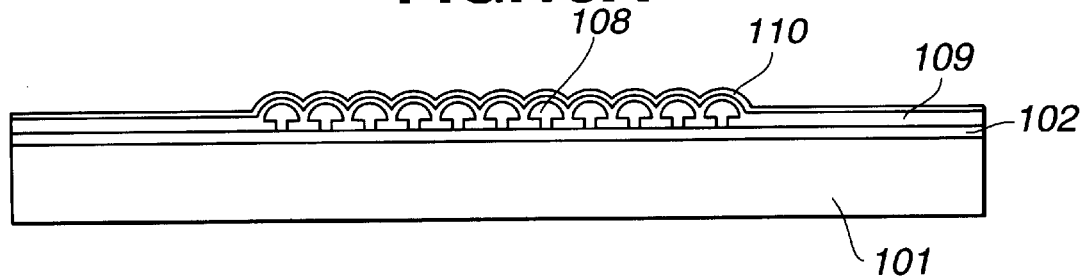
FIGS. 15A to 15F are cross-sectional views illustrating fabrication steps of a method of fabricating a microlens or the like of the fifth embodiment and so forth, respectively.
Figure 15B:
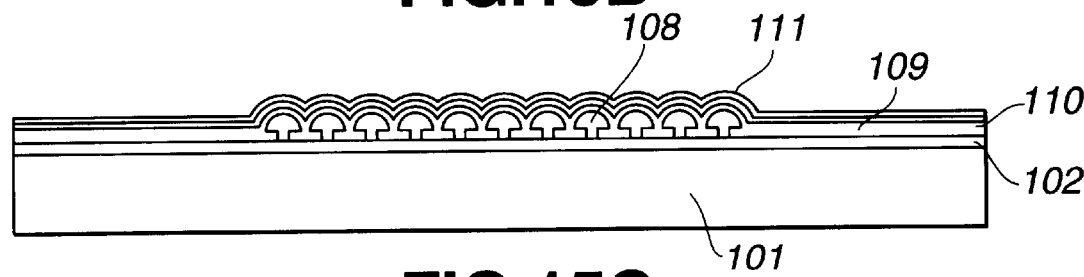

A fabrication process of a mold will be described by reference to FIGS. 15A to 15F. The above described structure is used as a master. PSG of 1 $\mu$m in thickess of is deposited at 350° C. by an atmospheric-pressure CVD method to form a sacrificial layer 110 as illustrated in FIG. 15A. Ti and Au are continuously layered with thicknesses of 10 nm and 200 nm on the above wafer, respectively, using an electron-beam evaporation method. An electrode layer 111 for a mold is thus formed as illustrated in FIG. 15B.

Figure 15C:
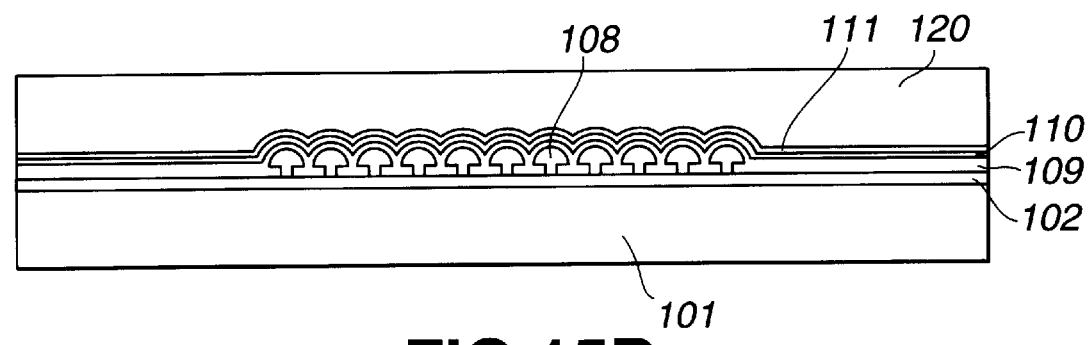

An Ni electroplating is then performed at a bath temperature of 50° C. and a cathodic current density of 5 A/dm$^2$, as illustrated in FIG. 15C. The above master is used as a base, and the above electrode layer 111 is used as the cathode. An Ni electroplating bath containing nickel (E1) sulfamate, nickel (II) bromide, boric acid and brightener is used. Thus, a mold 120 is formed as illustrated in FIG. 15C.

Figure 15D:

The wafer of FIG. 15C is then immersed in a mixture solution of hydrofluoric acid and ammonium fluoride to etch and remove the sacrificial layer 110 of PSG. The substrate 101 and the mold 120 can be separated as illustrated in FIG. 15D. The Ti of the electrode layer 111 for the mold can be removed simultaneously. After that, the Au of the electrode layer 111 is etched by a mixture solution of iodine and potassium iodide. The mold 120 for a convex microlens array can be thus produced as illustrated in FIG. 15D.

A microlens array is fabricated by using the above mold 120. After ultraviolet-ray hardening resin 112 is laid over the mold 120 for the convex microlens array fabricated by the above method, a glass layer 113 as a supporting substrate is then placed on the resin 112. The resin 112 is exposed to ultraviolet rays through the glass 113 to be hardened. After that, the glass 113 with the resin 112 is separated from the mold 120. Thus, a convex microlens array 115 is obtained as illustrated in FIG. 15F. The radius distribution of the convex semispherical microlens array 115 is also within 5%.

(Sixth Embodiment)

A sixth embodiment of a fabrication method of a mold for a semispherical microstructure array such as a microlens array will be described with reference to FIGS. 11A to 11F and 16.

The process to the formation of the opening 104 as illustrated in FIG. 11A is the same as that of the fifth embodiment. In the sixth embodiment, the interval between adjacent openings 104 is 18 $\mu$m. Further, 2000×2000 openings 104 are formed. The process that the first plated layer 106 is grown until its radius reaches about 10 $\mu$m in the usable region of the semispherical microstructure array is also the same as that of the fifth embodiment (see FIG. 11B).

FIG. 12 illustrates the radius distribution of the semispherical microstructures 106 illustrated in FIG. 11B. When the radius of the semispherical microstructure 106 in the usable region is about 10 $\mu$m, the maximum radius of the semispherical microstructure 106 is about 15 $\mu$m in the dummy region 105 of the array.

Figure 16:
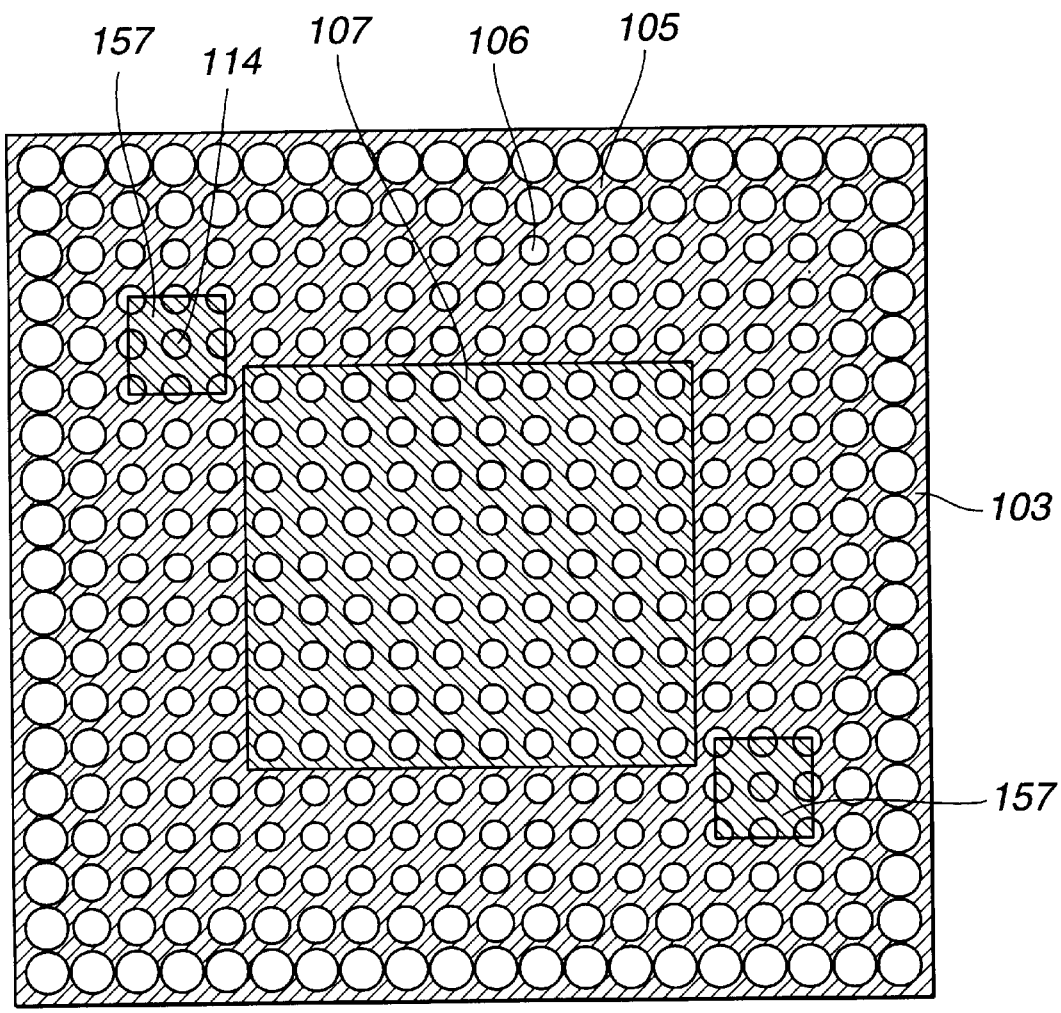
FIG. 16 is a plan view illustrating a substrate of a microstructure array of a sixth embodiment prior to a step of removing a dummy region.

The second mask layer 107 of positive photoresist (such as AzP 4620) is selectively formed in the usable region of 1064×806 microstructures, except the array-peripheral dummy region 105. In the sixth embodiment, markers 114 to be used for alignment at the time of bonding are formed as illustrated in FIG. 16. For this purpose, two second mask layers 157 are formed also at two desired positions (for example, diagonally opposite positions) outside the usable region of 1064×806 microstructures as illustrated in FIG. 16.

An electrolytic etching of the exposed first plated layers 106 (including partially-exposed first plated layers) is then performed at a bath temperature of 60° C. and an anodic current density of 8 A/dm$^2$. The above substrate is used as a base, and the electrode layer 102 is used as the anode. An Ni electroplating bath containing nickel (II) sulfate, nickel (II) chloride, boric acid and brightener is used. Since the electrode layer 102 is formed of Pt, the electrode layer 102 is not corroded. The electrolytic etching is stopped when the exposed first plated layers 106 of Ni are consumed.

Figure 17:
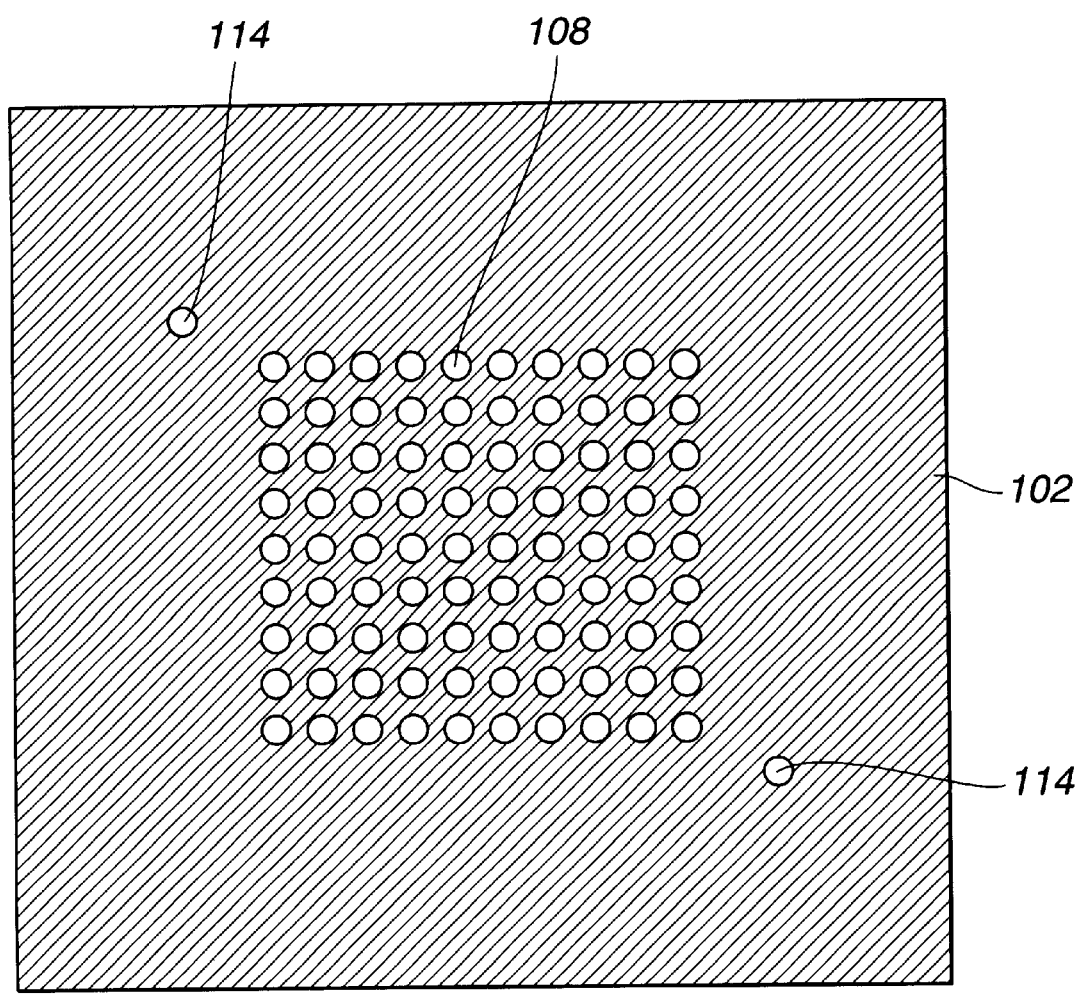
FIG. 17 is a plan view illustrating the substrate of the microstructure array of the sixth embodiment after the step of removing the dummy region.

The first and second mask layers 103 and 107 are then removed using acetone and dimethylformamide to form a semispherical microstructure array with 1064×806 semispherical microstructures 108 and the markers 114 as illustrated in FIG. 17. The radius distribution of 106433 806 semispherical microstructures 108 is within 5%.

An Ni electroplating of the second plated layer 109 is then performed at a bath temperature of 60° C. and a cathodic current density of 8 A/dm$^2$. The electrode layer 102 and the semispherical microstructures 108 are used as the cathode. An Ni electroplating bath containing nickel (II) sulfate, nickel (II) chloride, boric acid and brightener is used. Thus, a mold for a microlens array with the first plated layers 106 (including the markers 114) firmly fixed on the electrode layer 102 can be thus obtained. The radius of the second plated layer 109 is about 25 $\mu$m, and its radius distribution is within 5%.

As described above, in a mold for a microlens array with the markers 114 fabricated according to the fabrication method of this embodiment, the radius distribution of the semispherical microstructures 108 can be readily made small.

A mold for a convex microlens array can be fabricated by the same method as that of the fifth embodiment. In this mold, concave markers with an inverted profile of the convex marker 114 are formed.

Figure 18:
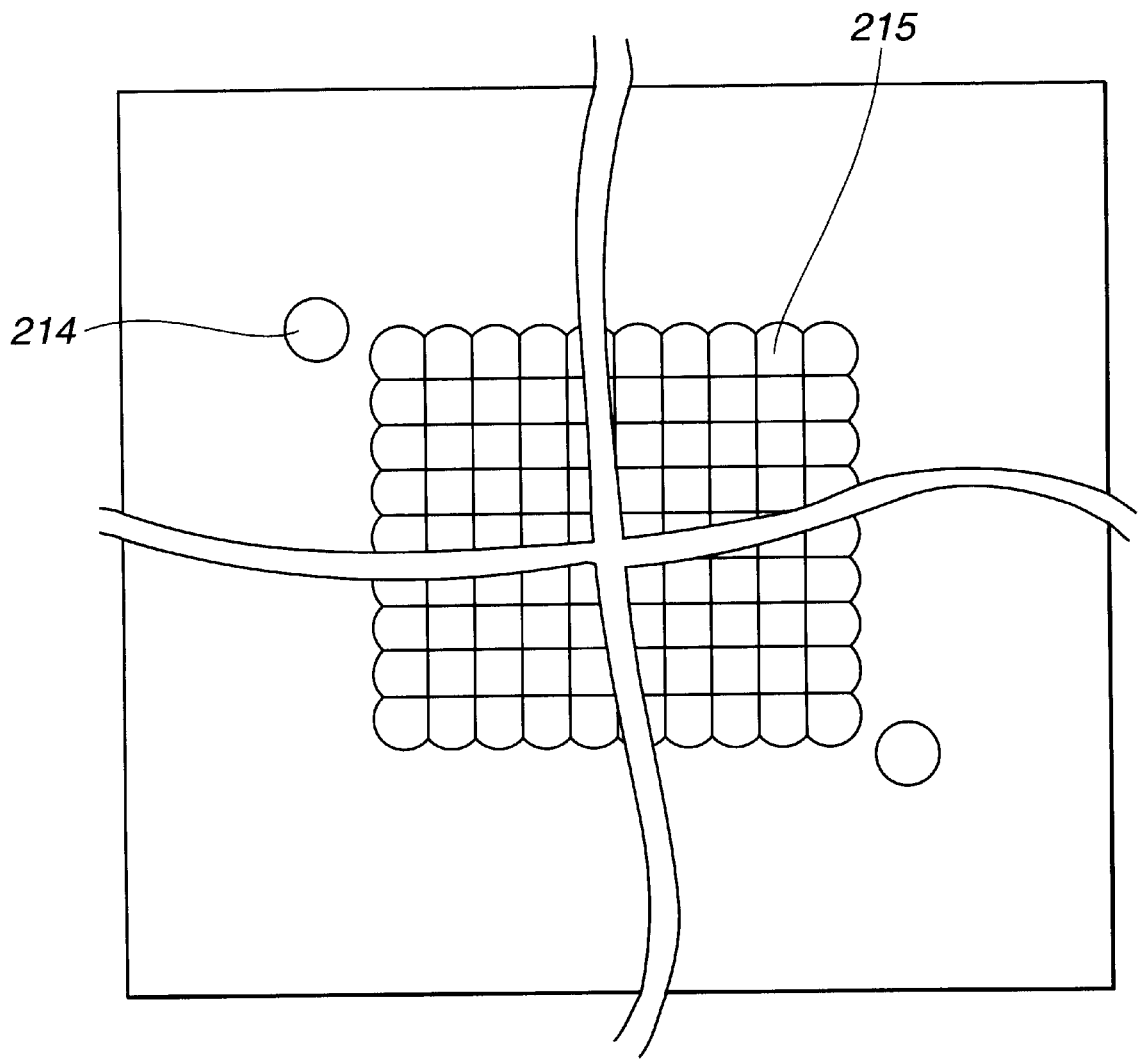
FIG. 18 is a plan view illustrating a convex microlens array with markers of the sixth embodiment.

A microlens array is fabricated by using the above mold for a convex microlens array. After ultraviolet-ray hardening resin 112 is laid over the mold, the glass layer 113 as a supporting substrate is then placed on the resin 112 (see FIG. 15E). The resin 112 is exposed to ultraviolet rays through the glass 113 to be hardened. After that, the glass 113 with the resin 112 is separated from the mold. Thus, a convex microlens array 215 with convex markers 214 for alignment is obtained as illustrated in FIG. 18. The radius distribution of the convex semispherical microlens array 215 is also within 5%.

For example, when a marker formed on a TFT liquid crystal substrate is aligned with the marker 214 of the convex microlens array 215 and the crystal substrate and the microlens array 215 are bonded, each microlens can be set at a position corresponding to each pixel. When those bonded structures are connected to a driver circuit and driven as a liquid crystal projector, incident light is condensed by each microlens and a bright display image can be obtained.

(Seventh Embodiment)

A seventh embodiment of a fabrication method of a mold for a semispherical microstructure array such as a microlens array will be described with reference to FIGS. 11A to 11F.

The process till the formation of the opening 104 as illustrated in FIG. 11A is the same as that of the fifth embodiment. In the seventh embodiment, the openings 104 are arrayed in a region of 950 mm in diameter on a silicon wafer. Further, the process that the first plated layer 106 is grown until its radius reaches about 10 $\mu$m in the usable region of the semispherical microstructure array is also the same as that of the fifth embodiment (see FIG. 11B).

The second mask layer 107 of positive photoresist (AzP 4620) is selectively formed in four regions of 700×700 microstructures in the usable region, except the array-peripheral dummy region 105.

An electrolytic etching of the exposed first plated layers 106 is then performed at a bath temperature of 60° C. and an anodic current density of 8 A/dm$^2$. The above substrate is used as a base, and the electrode layer 102 is used as the anode. An Ni electroplating bath containing nickel (II) sulfate, nickel (II) chloride, boric acid and brightener is used.

The first and second mask layers 103 and 107 are then removed using acetone and dimethylformamide to form a semispherical microstructure array with four regions of 700×700 semispherical microstructures 108. The radius distribution of the four regions is within 5%.

A mold for a convex microlens array can be fabricated by the same method as that of the fifth embodiment.

Four convex microlens arrays can be simultaneously fabricated by using the above mold. After ultraviolet-ray hardening resin 112 is coated over the mold 120, the glass layer 113 as a supporting substrate is then placed on the resin 112 (see FIG. 15E). The resin 112 is exposed to ultraviolet rays through the glass 113 to be hardened. After that, the glass 113 with the resin 112 is separated from the mold, and the four regions are divided. The radius distribution of each convex semispherical microlens array is also within 5%.

(Eighth Embodiment)

An eighth embodiment of a fabrication method of a mold for a semispherical microstructure array such as a microlens array will be described with reference to FIGS. 11A to 11F.

The process till the formation of the opening 104 as illustrated in FIG. 11A is the same as that of the fifth embodiment. In the eighth embodiment, the openings 104 are arrayed in a region of 950 mm in diameter on a silicon wafer. Further, the process that the first plated layer 106 is grown until its radius reaches about 10 $\mu$m in the usable region of the semispherical microstructure array is also the same as that of the fifth embodiment (see FIG. 11B).

The second mask layer 107 of positive photoresist (such as AzP 4620) is selectively formed in three kinds of regions of 700×700, 1024×768 and 700×350 microstructures in the usable region, except the array-peripheral dummy region 105.

An electrolytic etching of the exposed first plated layer 106 is then performed at a bath temperature of 60° C. and an anodic current density of 8 A/dm$^2$. The above substrate is used as a base, and the electrode layer 102 is used as the anode. An Ni electroplating bath containing nickel (II) sulfate, nickel (II) chloride, boric acid and brightener is used.

The first and second mask layers 103 and 107 are then removed using acetone and dimethylformamide to form a semispherical microstructure array with three kinds of regions of 700×700, 1024×768 and 700×350 microstructures 108 on a common wafer. The radius distribution of the three regions is within 5%.

A mold for a convex microlens array can be fabricated by the same method as that of the fifth embodiment.

Three different convex microlens arrays 115 can be simultaneously fabricated by using the above mold. After ultraviolet-ray hardening resin 112 is coated over the mold 120, the glass layer 113 as a supporting substrate is then placed on the resin 112 (see FIG. 15E). The resin 112 is exposed to ultraviolet rays through the glass 113 to be hardened. After that, the glass 113 with the resin 112 is separated from the mold, and the three regions are divided into three. The radius distribution of each convex semispherical microlens array is also within 5%.

(Ninth Embodiment)

A ninth embodiment of a fabrication method of a mold for a semispherical microstructure array such as a microlens array will be described with reference to FIGS. 19A to 19F.

A silicon wafer is thermally oxidized using an oxidizing gas, and layers of silicon dioxide with a thickness of 1 $\mu$m are formed on opposite surfaces of the wafer. This wafer is used as a substrate 201 illustrated in FIG. 19A. Ti and Ni are continuously layered with thicknesses of 50 Å and 500 Å on the above wafer, respectively, using a vacuum sputtering method which is one of the thin-film forming methods. An electrode layer 202 is thus formed. PSG is then deposited thereon at 350° C. by an atmospheric-pressure CVD method to form a first mask layer 203. The electrode layer 202 of Ni is firmly bonded to the first mask layer 203 of PSG due to their properties.

Positive photoresist (such as Az 1500) is then coated on the first mask layer 203. Optical exposure and development of this photoresist are performed using photolithography. Thereafter, with this photoresist used as a mask, a reactive ion etching of carbon tetrafluoride is conducted to partially expose the electrode layer 202. Openings 204 are thus formed in the first mask layer 203.

Figure 19A:
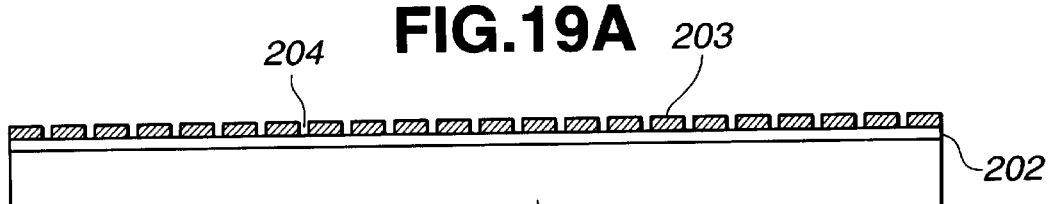
FIGS. 19A to 19F are cross-sectional views illustrating fabrication steps of a method of fabricating a microlens array mold or the like of a ninth embodiment according to the present invention.

As formed, the opening 204 has a circular shape and a diameter of 5 $\mu$m. The interval between the adjacent openings 204 is 25 $\mu$m. In this embodiment, 860×860 openings 204 are formed as illustrated in FIG. 19A.

Figure 19B:
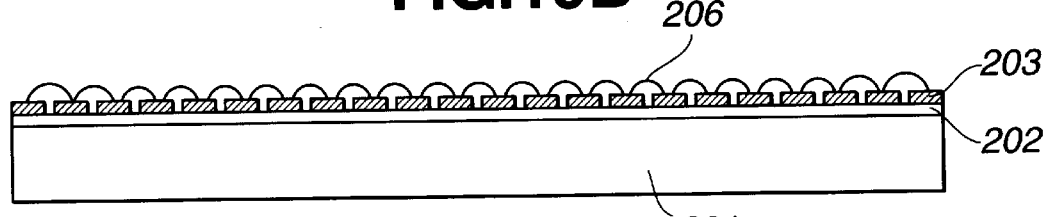

An Ni electroplating is then performed at a bath temperature of 60° C. and a cathodic current density of 40 A/dm$^2$. The above substrate 201 for electroplating is used as a base, and the electrode layer 202 is used as the cathode. An Ni electroplating bath containing nickel (II) sulfate, nickel (II) chloride, boric acid and brightener is used. A first Ni plated layer 206 is initially deposited in the opening 204 and is grown therein. The plated layer 206 expands onto the first mask layer 103, and a semispherical microstructure is thus formed as illustrated in FIG. 19B. The plated layer 206 is deposited until its radius reaches about 10 $\mu$m in a usable region of the semispherical microstructure array. When the radius of the semispherical microstructure is about 10 $\mu$m in the central usable region, the maximum radius of the semispherical microstructure is about 15 $\mu$m in a peripheral-region dummy region 205 of the array.

Figure 19C:
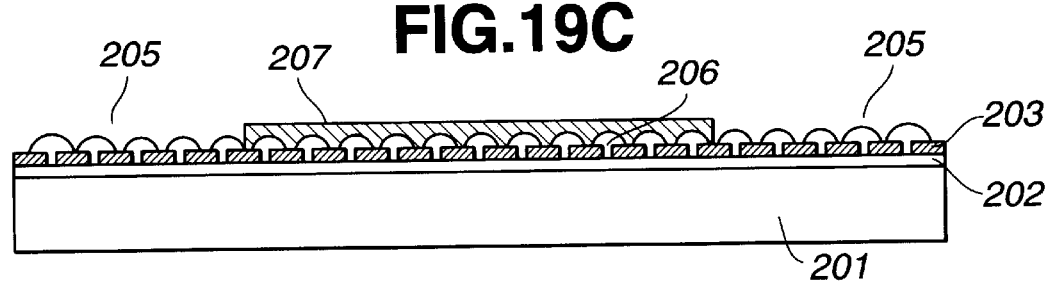

Positive photoresist (such as AzP 4620) is then coated, optically exposed and developed. A second mask layer 207 is selectively formed in the usable region of 700×700 microstructures, except in the dummy region 205 of 2 mm in width. The first plated layers 206 in the dummy region 205 are exposed as illustrated in FIG. 19C. The radius distribution of the first plated layers 202 covered with the second mask layer 207 is within 5%.

Figure 19D:
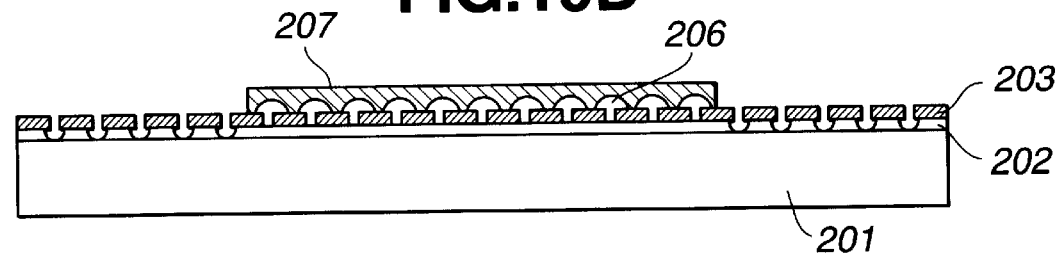

An electrolytic etching of the exposed first plated layers 206 is then performed at a bath temperature of 60° C. and an anodic current density of 8 A/dm$^2$. The above substrate is used as a base, and the electrode layer 202 is used as the anode. An Ni electroplating bath containing nickel (II) sulfate, nickel (II) chloride, boric acid and brightener is used. Since the electrode layer 202 is formed of Ni, a portion of the electrode layer 202 is also electrolytically etched as illustrated in FIG. 19D.

Figure 19E:
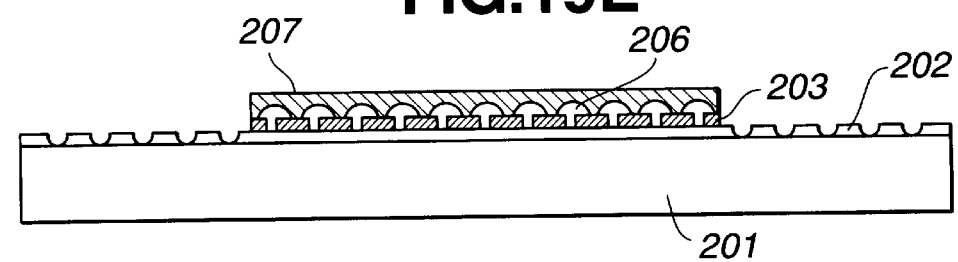

The first mask layers 203 not covered with the second mask layer 207 are then removed using a mixture solution of hydrofluoric acid and ammonium fluoride as illustrated in FIG. 19E. The second mask layer 207 is then removed using acetone and dimethylformamide.

In the structure of this embodiment, the substrate at this stage can also be used as a mold since the first plated layer 206 is relatively firmly fixed to the electrode layer 202.

In this embodiment, however, the process is further advanced.

An Ni electroplating is performed at a bath temperature of 60° C. and a cathodic current density of 40 A/dm$^2$. The above substrate 201 for electroplating is used as a base, and the electrode layer 202 and the first plated layer 206 are used as the cathode. An Ni electroplating bath containing nickel (II) sulfate, nickel (II) chloride, boric acid and brightener is used. The PSG mask layer 203 in the usable region is not removed since this layer 203 does not adversely work but rather serves to strengthen the fixing of semispherical microstructures 208.

Figure 19F:
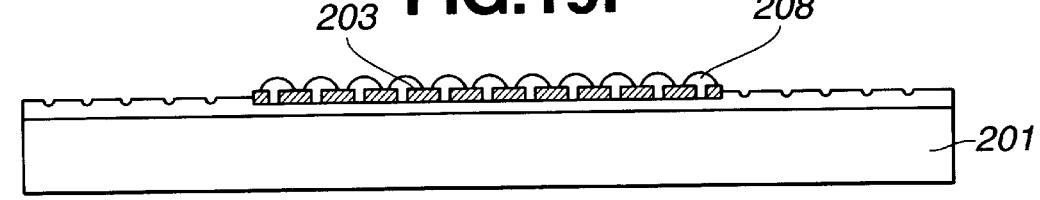

The electroplating is continued until adjacent first plated layers 206 are completely connected to each other. Thus, a semispherical microstructure array with 700×700 semispherical microstructures 208 can be achieved as illustrated in FIG. 19F. The radius distribution of the semispherical microstructures 208 is within 5%.

After that, a mold for a microlens array is fabricated by the process of FIGS. 15A to 15F as in the fifth embodiment, and a convex microlens array is fabricated. The radius distribution of the convex semispherical microlens array is also within 5%.

(Tenth Embodiment)

A tenth embodiment of a fabrication method of a mold for a semispherical microstructure array such as a microlens array will be described with reference to FIGS. 11A to 11F.

The process till the formation of the openings 104 as illustrated in FIG. 11A is the same as that of the fifth embodiment. In the tenth embodiment, the opening 104 has a circular shape and a diameter of 5 $\mu$m. The openings 104 are arrayed at the interval of 18 $\mu$m in a matrix pattern of 3900×3900. Further, the process that the first plated layer 106 is grown until its radius reaches about 10 $\mu$m in a central usable region of the semispherical microstructure array is the same as that of the fifth embodiment (see FIG. 11B).

The second mask layer 107 of positive photoresist (AzP 4620) is selectively formed in the usable region of 1064×808 microstructures, except in the array-peripheral dummy region 105 as illustrated in FIG. 1C.

An electrolytic etching of the exposed first plated layers 106 is then performed at a bath temperature of 60° C. and an anodic current density of 8 A/dm². The above substrate is used as a base, and the electrode layer 106 is used as the anode. An Ni electroplating bath containing nickel (II) sulfate, nickel (II) chloride, boric acid and brightener is used.

The first and second mask layers 103 and 107 are then removed using acetone and dimethylformamide to form a semispherical microstructure array with a region of 1064× 808 microstructures 108 as illustrated in FIG. 11E. The radius distribution of the semispherical microstructures 108 is within 5%.

An Ni electroless plating is then performed at a bath temperature of 90° C. to form the second plated layer 109 (see FIG. 11F). An Ni electroless plating liquid (such as S-780 (trade name) produced by Nihon Kanizen Com.) containing a reducing agent of hypophosphite is used. Thereby, the first plated layer 106 is firmly bonded to the electrode layer 102. Thus, a mold for a microlens array with a high glossiness can be obtained by using the electroless plating to form the second plated layer 109.

In this mold having uniform semispherical microstructures 108, radii of the plated layer 109 along diagonal and horizontal directions are approximately equal to an average curvature radius of 20 $\mu$m, and the radius distribution is within ±1 $\mu$m (i.e., 5%).

As described above, in the mold for a microlens array fabricated according to the fabrication method of this embodiment, the radius distribution of the semispherical microstructures 108 can be readily made small.

Then, a remover agent (such as Nikka-nontack (trade name) produced by Nihon Kagaku Sangyou Com.) for the mold is coated on the mold master. An Ni electroplating is then performed at a bath temperature of 50° C. and a cathodic current density of 5 A/dm². The above substrate is used as the cathode. An Ni electroplating bath containing nickel (II) sulfamate, nickel (II) bromide, boric acid and brightener is used. The mold is thus formed. Thereafter, the mold is separated from the substrate to form a mold for a microlens array.

Figure 15E:
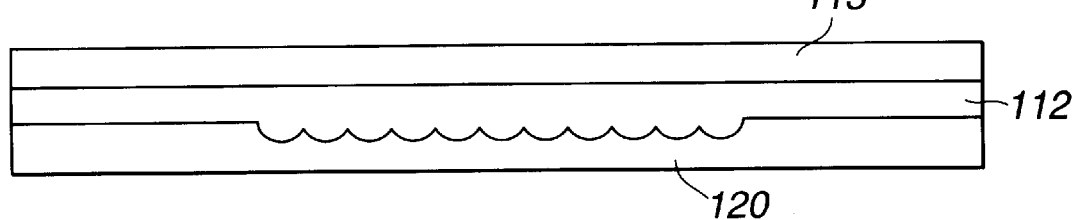
Figure 15F:
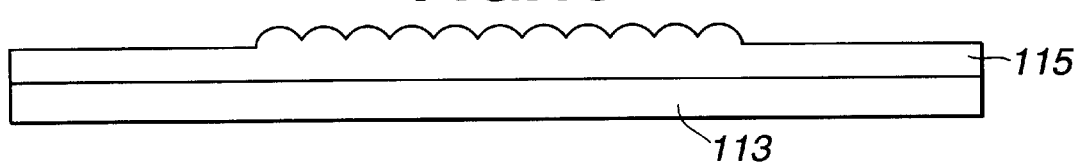

After ultraviolet-ray hardening resin 112 is coated over the mold 120, the glass layer 113 as a supporting substrate is then placed on the resin 112 (see FIG. 15E). The resin 112 is exposed to ultraviolet rays through the glass 113 to be hardened. After that, the glass 113 with the resin 112 is separated from the mold to form the convex microlens array 115. The radius distribution of the convex semispherical microlens array 115 is also within 5%.

(Eleventh Embodiment)

An eleventh embodiment of a fabrication method of a mold for a semispherical microstructure array such as a microlens array will be described with reference to FIGS. 11A to 11F and 20.

A silicon wafer of 5 inches in diameter is thermally oxidized using an oxidizing gas, and layers of silicon dioxide with a thickness of 1 $\mu$m are formed on opposite surfaces of the wafer. This wafer is used as the substrate 101 illustrated in FIG. 11A. Ti and Pt are continuously layered with thicknesses of 50 Å and 500 Å on the above wafer, respectively, using the vacuum sputtering method. The electrode layer 102 is thus formed. Positive photoresist (such as Az 1500) is then deposited thereon to form the first mask layer 103.

Positive photoresist 103 is then coated on the first mask layer 103. Optical exposure and development of this photoresist are performed using photolithography. Thereafter, with this photoresist used as a mask, etching is conducted to partially expose the electrode layer 102. Openings 104 are thus formed in the first mask layer 103.

As formed, the opening 104 has a circular shape and a diameter of 5 $\mu$m. The interval between the adjacent openings 104 is 18 $\mu$m. In this embodiment, a two-dimensional array of openings 104 is formed in a 145 mm-diameter region on the silicon wafer.

An Ni electroplating is then performed at a bath temperature of 60° C. and a cathodic current density of 40 A/dm². The above substrate 101 for electroplating is used as a base, and the electrode layer 102 is used as the cathode. An Ni electroplating bath containing nickel (II) sulfate, nickel (II) chloride, boric acid and brightener is used. The first Ni plated layer 106 is initially deposited in the opening 104 and is grown therein. The plated layer 106 expands onto the first mask layer 103, and a semispherical microstructure is thus formed as illustrated in FIG. 11B. The plated layer 106 is deposited until its radius reaches about 10 $\mu$m in a central usable region of the semispherical microstructure array.

Positive photoresist (such as AzP 4620) is then coated, optically exposed and developed. A second mask layer 107 is selectively formed in eight regions 307 of 1064×808 microstructures 108 arranged at the interval of 1.8 mm (see, FIG. 20), except in the array-peripheral dummy region 105. In the eleventh embodiment, patterns 314 of the second mask layer 107 for forming markers to be used for alignment at the time of bonding are formed around the respective regions 307. The pattern 314 is made of the second mask layer 7, and four patterns 314 are provided near four corners of each region 307, respectively.

An electrolytic etching of the exposed first plated layers 106 is then performed at a bath temperature of 60° C. and an anodic current density of 8 A/dm² to yield the structure illustrated in FIG. 11D. The above substrate is used as a base, and the electrode layer 106 is used as the anode. An Ni electroplating bath containing nickel (II) sulfate, nickel (II) chloride, boric acid and brightener is used.

Figure 20:
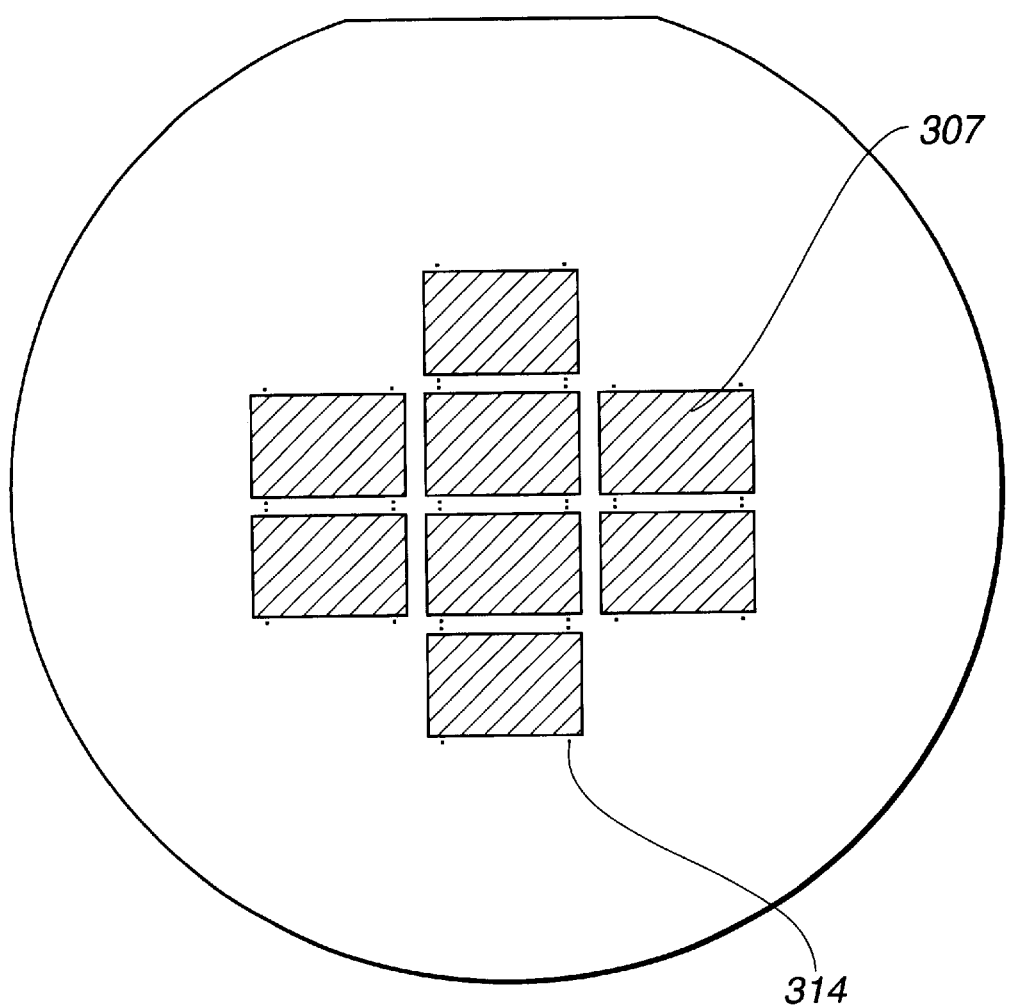
FIG. 20 is a plan view illustrating illustrating a substrate or a microstructure array of an eleventh embodiment after a step of removing a dummy region.

The first and second mask layers 103 and 107 are then removed using acetone and dimethylformamide to form a semispherical microstructure array with eight regions 307 of 1064×808 microstructures 108 and markers (see FIG. 20). The radius distribution of the semispherical microstructures 108 in the entire semispherical microstructure array is within 5%.

An Ni electroless plating is then performed at a bath temperature of 90° C. to form the second plated layer 109 (see FIG. 11F). An Ni electroless plating liquid (such as S-780) containing a reducing agent of hypophosphite is used. Thereby, the first plated layer 106 is firmly bonded to the electrode layer 102. Thus, a mold for a microlens array with a high glossiness can be obtained by using the electroless plating to form the second plated layer 109.

In this mold having uniform semispherical microstructures 108, radii of the second plated layer 109 along diagonal and horizontal directions are approximately equal to an average curvature radius of 20 $\mu$m, and the radius distribution is within ±1 $\mu$m.

Then, a remover agent (such as Nikka-nontack) for the mold is coated on the mold master. An Ni electroplating is then performed at a bath temperature of 50° C. and a cathodic current density of 5 A/dm$^2$. The above substrate is used as the cathode. An Ni electroplating bath containing nickel (II) sulfamate, nickel (II) bromide, boric acid and brightener is used. The mold is thus formed. Thereafter, the mold is separated from the substrate to form a mold for a microlens array. Thus, there is provided a mold for a microlens array which can produce eight convex microlens arrays with four markers.

After ultraviolet-ray hardening resin 112 is coated over the mold 120, the glass layer 113 as a supporting substrate is then placed on the resin 112 (see FIG. 15E). The resin 112 is exposed to ultraviolet rays through the glass 113 to be hardened. After that, the glass 113 with the resin 112 is separated from the mold and divided into eight parts to form eight convex microlens arrays 115 (see FIG. 15F). The radius distribution of each convex semispherical microlens 115 is also within 5%.

Meanwhile, also when parallel stripe-shaped openings are formed in the first insulating layer, the dummy region is continuously set around the usable region. Therefore, the dummy region typically includes some entire stripe openings on right and left sides of the substrate and both end portions of the stripe openings on uppermost and lowermost sides of the substrate.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A fabrication method of fabricating an array of microstructures comprising the steps of:

preparing a substrate with a surface including a usable region and a dummy region continuously set around the usable region, the usable region and the dummy region of the substrate having an electrically conductive portion;

forming a first insulating layer on the conductive portion;

forming a plurality of openings in the first insulating layer, the openings being arranged in a predetermined array pattern; and performing one of electroplating and electrodeposition using the conductive portion as an electrode to form a first plated or electrodeposited layer in the openings and on the first insulating layer in both the usable region and the dummy region.

2. A fabrication method according to claim 1, further comprising the steps of forming a sacrificial layer under the conductive portion in the dummy region of the substrate before said step of preparing the substrate; and removing the sacrificial layer to remove the first plated or electrodeposited layer formed in the dummy region.

3. A fabrication method according to claim 2, further comprising a step of performing electroplating on the usable region of the substrate including a portion of the first insulating layer at a periphery of the usable region.

4. A fabrication method according to claim 2, further comprising a step of forming a spacer layer under the conductive portion, before said step of preparing the substrate, in the usable region of the substrate to equalize a height level of the conductive portion in the usable region with a height level of the conductive portion in the dummy region.

5. A fabrication method according to claim 1, further comprising a step of forming a step layer under the conductive portion in the dummy region of the substrate to form different height levels of the conductive portion between the usable region and the dummy region.

6. A fabrication method according to claim 1, wherein the usable region contains a plurality of blocks.

7. A fabrication method according to claim 6, wherein the blocks are separated from each other by a boundary portion of the substrate.

8. A fabrication method according to claim 7, further comprising the steps of forming a sacrificial layer under the conductive portion in the dummy region and the boundary portion of the substrate before said step of preparing the substrate; and removing the sacrificial layer to remove the first plated or electrodeposited layer formed in the dummy region and the boundary portion.

9. A fabrication method according to claim 6, wherein each block of the usable region includes the same array of the first plated or electrodeposited layers.

10. A fabrication method according to claim 6, further comprising a step of dividing the substrate into the blocks after the first plated or electrodeposited layer is formed.

11. A fabrication method according to claim 6, wherein blocks of the usable region include different arrays of the first plated or electrodeposited layer, respectively.

12. A fabrication method according to claim 1, further comprising a step of cutting off the dummy region of the substrate after the first plated or electrodeposited layer is formed.

13. A fabrication method according to claim 12, further comprising a step of bonding the substrate with only the usable region to a supporting substrate.

14. A fabrication method according to claim 1, wherein the first plated layer is electroplated in the openings and on the first insulating layer.

15. A fabrication method according to claim 14, further comprising the steps of forming a second insulating layer on the usable region; and performing an electrolytic etching of the first plated layer in the dummy region without the second insulating layer by applying a voltage using the conductive portion as an anode.

16. A fabrication method according to claim 15, further comprising the steps of removing the second insulating layer after the electrolytic etching step is performed; removing the first insulating layer; and forming a second plated or electrodeposited layer continuously on the conductive portion in the dummy region and the first plated layer in the usable region.

17. A fabrication method according to claim 16, wherein the second plated or electrodeposited layer is formed by electroplating using the conductive portion and the first plated layer as a cathode.

18. A fabrication method according to claim 16, wherein the second plated or electrodeposited layer is formed by electrodeposition using the conductive portion and the first plated layer as an electrode.

19. A fabrication method according to claim 16, wherein the second plated or electrodeposited layer is a plated layer formed by electroless plating.

20. A fabrication method according to claim 16, wherein the second plated or electrodeposited layer includes a nickel plated layer.

21. A fabrication method according to claim 20, wherein the layer of nickel includes an electroless plated layer.

22. A fabrication method according to claim 20, wherein the second plated or electrodeposited layer further includes phospher.

23. A fabrication method according to claim 15, further comprising the steps of removing the first insulating layer not covered with the second insulating layer; and removing the second insulating layer.

24. A fabrication method according to claim 23, further comprising a step of forming a second plated or electrodeposited layer continuously on the conductive portion in the dummy region and the first plated layer in the dummy region.

25. A fabrication method according to claim 24, wherein the second plated or electrodeposited layer is formed by electroplating using the conductive portion and the first plated layer as a cathode.

26. A fabrication method according to claim 24, wherein the second plated or electrodeposited layer is formed by electrodeposition using the conductive portion and the first plated layer as an electrode.

27. A fabrication method according to claim 24, wherein the second plated or electrodeposited layer is a plated layer formed by electroless plating.

28. A fabrication method according to claim 15, wherein the usable region includes a plurality of blocks.

29. A fabrication method according to claim 28, wherein the second insulating layer is formed on the blocks of the usable region.

30. A fabrication method according to claim 15, further comprising a step of forming an alignment marker having the first plated layer.

31. A fabrication method according to claim 30, wherein the alignment marker is formed of the first plated layer covered with the second insulating layer when the first plated layer in the usable region is covered with the second insulating layer.

32. A fabrication method according to claim 15, wherein the electrolytic etching step is performed using the same electroplating bath used when the first plated layer is formed.

33. A fabrication method according to claim 15, wherein the conductive portion and the first plated layer are formed of materials that do not produce an alloy layer therebetween.

34. A fabrication method according to claim 15, wherein the conductive portion and the first plated layer are formed of materials that do not produce an alloy layer in the first plated layer due to a diffusion of the material of the conductive portion into the material of the first plated layer.

35. A fabrication method according to claim 15, wherein the conductive portion and the first plated layer are composed of materials that produce an alloy layer in the conductive portion due to a diffusion of material of the first plated layer into material of the conductive portion.

36. A fabrication method according to claim 1, wherein the predetermined array pattern is a two-dimensional array pattern which is periodic in at least a predetermined direction.

37. A fabrication method according to claim 1, wherein the predetermined pattern is an array pattern which is periodic in mutually-orthogonal four directions.

38. A fabrication method according to claim 1, wherein the predetermined array pattern is a periodic stripe pattern.

39. A fabrication method according to claim 1, wherein a width of the dummy region of the substrate is set to 2 mm or more.

40. A fabrication method according to claim 1, wherein the openings have a circular shape and the microstructure is a semispherical microstructure.

41. A fabrication method according to claim 1, wherein the openings have an elongated stripe shape and the microstructure is a semicylindrical microstructure.

42. A fabrication method according to claim 1, further comprising the steps of forming a mold on the usable region of the substrate with the first plated or electrodeposited layer; and separating the mold from the substrate.

43. A fabrication method according to claim 42, further comprising the step of forming the mold using electroplating.

44. A fabrication method according to claim 42, further comprising the step of fabricating a microlens array from the mold.

45. A fabrication method according to claim 42, further comprising the steps of coating a light-transmitting material on the mold; hardening the light-transmitting material; and separating the material from the mold to obtain the microlens array.

46. A fabrication method according to claim 42, further comprising the steps of coating a light-transmitting material on another substrate; pushing the mold against the light-transmitting material on the another substrate; hardening the light-transmitting material; and separating the material from the mold to obtain the microlens array.

47. A fabrication method according to claim 1, wherein the first insulating layer is composed of a material which adheres to the conductive portion.

48. A fabrication method according to claim 1, wherein the first insulating layer is composed of phosphosilicate glass.

49. A fabrication method according to claim 1, wherein the first plated or electrodeposited layers are formed separately from each other.

50. A fabrication method according to claim 1, wherein a distribution of a radius of the microstructures is within 5%.

51. A fabrication method according to claim 1, wherein the first electrodeposited layer is electrodeposited in the openings and on the first insulating layer.

* * * * *

UNITED STATES PATENT AND TRADEMARK OFFICE
CERTIFICATE OF CORRECTION

PATENT NO.    : 6,436,265 B1  
DATED         : August 20, 2002  
INVENTOR(S)   : Yasuhiro Shimada et al.

It is certified that error appears in the above-identified patent and that said Letters Patent is hereby corrected as shown below:

Column 8,  
Line 65, "illustrating" ($2^{nd}$ occurrence) should be deleted; and  
Line 66, "or a" should read -- of a --.

Column 14,  
Line 61, "thickness of is" should read -- thickness is --.

Column 15,  
Line 5, "(E1)" should read -- (II) --; and  
Line 36, "that" should read -- in which --.

Column 16,  
Line 2, "106433 806" should read -- 1064 x 806 --; and  
Line 51, "that" should read -- in which --.

Column 17,  
Line 23, "that" should read -- in which --.

Column 19,  
Line 21, "that" should read -- in which --.

Column 21,  
Line 44, "uppermostand" should read -- uppermost and --.

Signed and Sealed this

Twenty-eighth Day of January, 2003

JAMES E. ROGAN  
*Director of the United States Patent and Trademark Office*